(12) United States Patent
Chen et al.

(10) Patent No.: US 10,559,318 B1
(45) Date of Patent: Feb. 11, 2020

(54) MAGNETIC RECORDING ASSISTED BY A SINGLE SPIN HALL EFFECT (SHE) LAYER IN THE WRITE GAP

(71) Applicant: Headway Technologies, Inc., Milpitas, CA (US)

(72) Inventors: Wenyu Chen, San Jose, CA (US); Yan Wu, Cupertino, CA (US)

(73) Assignee: Headway Technologies, Inc., Milpitas, CA (US)

( * ) Notice: Subject to any disclaimer, the term of this patent is extended or adjusted under 35 U.S.C. 154(b) by 0 days.

(21) Appl. No.: 16/370,613

(22) Filed: Mar. 29, 2019

(51) Int. Cl.
  *G11B 5/11* (2006.01)
  *G11B 5/187* (2006.01)
  *G11B 5/00* (2006.01)

(52) U.S. Cl.
  CPC .............. *G11B 5/11* (2013.01); *G11B 5/187* (2013.01); *G11B 2005/0005* (2013.01)

(58) Field of Classification Search
  CPC ... G11B 5/11; G11B 5/187; G11B 2005/0005; G11B 5/37; G11B 5/4826; G11B 5/4833; G11B 5/6082
  USPC .................. 360/123.1–123.15, 123.2, 123.3, 360/235–235.5
  See application file for complete search history.

(56) References Cited

U.S. PATENT DOCUMENTS

| | | | |
|---|---|---|---|
| 6,785,092 B2 | 8/2004 | Covington et al. | |
| 6,809,899 B1 | 10/2004 | Chen et al. | |
| 6,954,340 B2 | 10/2005 | Shukh et al. | |
| 7,009,812 B2 | 3/2006 | Hsu et al. | |
| 7,589,600 B2 | 9/2009 | Dimitrov et al. | |
| 7,724,469 B2 | 5/2010 | Gao et al. | |
| 7,835,111 B2 | 11/2010 | Flint et al. | |
| 7,957,098 B2 | 6/2011 | Yamada et al. | |

(Continued)

FOREIGN PATENT DOCUMENTS

| | | |
|---|---|---|
| JP | 2002-133610 | 5/2002 |
| JP | 2002-298309 | 10/2002 |

(Continued)

OTHER PUBLICATIONS

PTO Office Action, U.S. Appl. No. 12/964,202, Applicant: Sasaki et al., Notification dated Nov. 28, 2012, 11 pages.

(Continued)

*Primary Examiner* — Allen T Cao
(74) *Attorney, Agent, or Firm* — Stephen B. Ackerman; Saile Ackerman LLC

(57) ABSTRACT

A Spin Hall Effect (SHE) assisted magnetic recording device is disclosed wherein a SHE layer comprising a giant Spin Hall Angle material is formed between a main pole (MP) trailing side and trailing shield (TS) bottom surface. The SHE layer may contact one or both of the MP and TS, has a front side at the air bearing surface (ABS) or recessed therefrom, and a backside up to 80 nm from the ABS. Current ($I_{SHE}$) is applied in a cross-track direction and synchronized with the write current. Depending on SHE layer placement, a transverse spin transfer torque is applied to one or both of a local MP magnetization at the MP trailing side and a local TS magnetization at the TS bottom surface thereby tilting the former to a direction that enhances the MP write field and tilting the latter to a direction that increases the TS return field.

38 Claims, 15 Drawing Sheets

(56) References Cited

U.S. PATENT DOCUMENTS

| | | |
|---|---|---|
| 7,963,024 B2 | 6/2011 | Neuhaus |
| 7,978,442 B2 | 7/2011 | Zhang et al. |
| 7,982,996 B2 | 7/2011 | Smith et al. |
| 8,027,110 B1 | 9/2011 | Yamanaka et al. |
| 8,064,244 B2 | 11/2011 | Zhang et al. |
| 8,068,312 B2 | 11/2011 | Jiang et al. |
| 8,154,825 B2 | 4/2012 | Takashita et al. |
| 8,203,389 B1 | 6/2012 | Zhou et al. |
| 8,264,792 B2 | 9/2012 | Bai et al. |
| 8,270,112 B2 | 9/2012 | Funayama et al. |
| 8,295,008 B1 | 10/2012 | Sasaki et al. |
| 8,310,787 B1 | 11/2012 | Sasaki et al. |
| 8,320,079 B2 | 11/2012 | Iwasaki et al. |
| 8,427,781 B1 | 4/2013 | Sasaki et al. |
| 8,446,690 B2 | 5/2013 | Alex et al. |
| 8,462,461 B2 | 6/2013 | Braganca et al. |
| 8,477,452 B2 | 7/2013 | Sasaki et al. |
| 8,493,687 B2 | 7/2013 | Sasaki et al. |
| 8,582,240 B1 | 11/2013 | Chen et al. |
| 8,582,241 B1 | 11/2013 | Yu et al. |
| 8,604,886 B2 | 12/2013 | Nikonov et al. |
| 8,634,163 B2 | 1/2014 | Tanabe et al. |
| 8,749,919 B2 | 6/2014 | Sasaki et al. |
| 8,767,347 B1 | 7/2014 | Sasaki et al. |
| 8,792,210 B2 | 7/2014 | de la Fuente et al. |
| 9,142,228 B2 | 9/2015 | Fujita et al. |
| 9,196,271 B1 * | 11/2015 | Shirotori ............ G11B 5/3109 |
| 9,230,571 B1 | 1/2016 | Chen et al. |
| 9,299,367 B1 | 3/2016 | Tang et al. |
| 9,361,912 B1 | 6/2016 | Liu et al. |
| 9,406,317 B1 | 8/2016 | Tang et al. |
| 9,466,319 B1 | 10/2016 | Tang et al. |
| 9,824,701 B2 | 11/2017 | Tang et al. |
| 9,934,797 B2 | 4/2018 | Takahashi et al. |
| 9,966,091 B2 | 5/2018 | Chen et al. |
| 10,032,469 B2 | 7/2018 | Lim et al. |
| 10,037,772 B2 | 7/2018 | Okamura et al. |
| 10,079,057 B2 | 9/2018 | Ozbay et al. |
| 10,141,037 B2 | 11/2018 | Ohsawa et al. |
| 10,181,334 B1 | 1/2019 | Song et al. |
| 2002/0034043 A1 | 3/2002 | Okada et al. |
| 2004/0150910 A1 | 8/2004 | Okada et al. |
| 2005/0128637 A1 | 6/2005 | Johnston et al. |
| 2005/0141137 A1 | 6/2005 | Okada |
| 2006/0044682 A1 | 3/2006 | Le et al. |
| 2006/0087765 A1 | 4/2006 | Iwakura et al. |
| 2006/0103978 A1 | 5/2006 | Takano et al. |
| 2007/0177301 A1 | 8/2007 | Han et al. |
| 2008/0013209 A1 | 1/2008 | Sasaki et al. |
| 2008/0088972 A1 | 4/2008 | Sasaki et al. |
| 2009/0059426 A1 | 3/2009 | Sasaki et al. |
| 2009/0080106 A1 | 3/2009 | Shimizu et al. |
| 2009/0128953 A1 | 5/2009 | Jiang et al. |
| 2009/0296275 A1 | 12/2009 | Sasaki et al. |
| 2010/0165517 A1 | 7/2010 | Araki et al. |
| 2011/0211271 A1 | 9/2011 | Ng et al. |
| 2012/0292723 A1 | 11/2012 | Luo et al. |
| 2014/0071562 A1 | 3/2014 | Chen et al. |
| 2014/0177092 A1 | 6/2014 | Katada et al. |
| 2015/0043106 A1 | 2/2015 | Yamada et al. |
| 2016/0218728 A1 | 7/2016 | Zhu |
| 2017/0133044 A1 | 5/2017 | Lim et al. |
| 2018/0075868 A1 | 3/2018 | Koui et al. |

FOREIGN PATENT DOCUMENTS

| | | |
|---|---|---|
| JP | 2008-021398 | 1/2008 |
| JP | 2010-157303 | 7/2010 |

OTHER PUBLICATIONS

"The Feasibility of Magnetic Recording at 10 Terabits Per Square Inch on Conventional Media," by Roger Wood et al., IEEE Transactions on Magnetics, vol. 45, No. 2, Feb. 2009, pp. 917-923.

Microwave Assisted Magnetic Recording, by Jian-Gang Zhu et al., IEEE Transactions on Magnetics, vol. 44, No. 1, Jan. 1, 2008, pp. 125-131.

Nov. 13, 2012, Office Action issued in Japanese Patent Application No. 2011-149242, with English language translation.

Nov. 13, 2012, Office Action issued in Japanese Patent Application No. 2011-149243, with English language translation.

Nov. 13, 2012, Office Action issued in Japanese Patent Application No. 2011-149244, with English language translation.

"Spin-Torque Oscillator Based on Magnetic Tunnel Junction with a Perpendicularly Magnetized Free Layer and In-Plane Magnetized Polarizer," by Hitoshi Kubota, et al., 2013 The Japan Society of Applied Physics, Applied Physics Express 6 (2013) 103003, Sep. 27, 2013, pp. 1-3.

"High-Power Coherent Microwave Emission from Magnetic Tunnel Junction Nano-oscillators with Perpendicular Anisotropy," by Zhongming Zeng, et al, 2012 American Chemical Society, Jun. 4, 2012, vol. 6, No. 7, pp. 6115-6121.

"Spin-Torque Switching with the Giant Spin Hall Effect of Tantalum," by Luqiao Liu et al., Science May 4, 2012: vol. 336, Issue 6081, pp. 555-558, DOI: 10.1126/science.1218197.

D'Yakonov, M. I., Spin Hall Effect. Int. J. Mod. Phys. B 23, 2556-2565 (2009).

"Spin-Torque Ferromagnetic Resonance Induced by the Spin Hall Effect," by Luqiao Liu et al, Physical Review Letters, PRL 106, 036601 (2011), Jan. 21, 2011, pp. 1-4.

"Surface-Assisted Spin Hall Effect in Au Films with Pt Impurities," by B. Gu et al., Physical Review Letters, PRL 105, 216401 (2010), Nov. 19, 2010, pp. 1-4.

* cited by examiner

MAGNETIC RECORDING ASSISTED BY A SINGLE SPIN HALL EFFECT (SHE) LAYER IN THE WRITE GAP

RELATED PATENT APPLICATIONS

This application is related to the following: Ser. No. 16/209,151, filed on Dec. 4, 2018; and Ser. No. 16/370,634, filed on Mar. 29, 2019; assigned to a common assignee, and herein incorporated by reference in their entirety.

TECHNICAL FIELD

The present disclosure relates to a Spin Hall Effect assisted magnetic recording (SHAMR) structure wherein a Spin Hall Effect (SHE) layer comprised of a giant positive or negative Spin Hall Angle (SHA) material is formed in the write gap between a main pole (MP) and trailing shield (TS), and wherein a current ($I_{SHE}$) is applied across the SHE layer through a circuit connected in series or parallel with a write current (Iw) circuit, or in a separate circuit, so that when $I_{SHE}$ is applied in a cross-track direction and is synchronized with Iw, transverse spin transfer torque is applied to one or both of a local MP magnetization at the MP/SHE interface and to a local TS magnetization at the SHE/TS interface depending on SHE layer placement thereby enhancing the MP write field and TS return field, respectively, improving writer transition speed, and avoiding a high current threshold typical of other writer assist mechanisms.

BACKGROUND

As the data areal density in hard disk drive (HDD) writing increases, write heads and media bits are both required to be made in smaller sizes. However, as the write head size shrinks, its writability degrades. To improve writability, new technology is being developed that assists writing to a media bit. Two main approaches currently being investigated are thermally assisted magnetic recording (TAMR) and microwave assisted magnetic recording (MAMR) where a spin torque device is employed to generate a high frequency field that helps writing. The latter is described by J-G. Zhu et al. in "Microwave Assisted Magnetic Recording", IEEE Trans. Magn., vol. 44, pp. 125-131 (2008). A third approach called STRAMR (spin torque reversal assisted magnetic recording) relies on spin torque to reverse a magnetization in a layer in the write gap (WG), for example, to increase reluctance and force more magnetic flux from the MP at the ABS. STRAMR is described in U.S. Pat. No. 6,785,092. Related patent application Ser. No. 16/209,151 describes a writer where the MAMR and STRAMR (spin flipping element) effects may exist simultaneously.

Spin transfer torque devices (also known as STO devices) are based on a spin-transfer effect that arises from the spin dependent electron transport properties of ferromagnetic-spacer-ferromagnetic multilayers. When current passes through a magnetic multilayer in a CPP (current perpendicular to plane) configuration, the first ferromagnetic (FM) layer will generate spin polarized currents as the electrons traverse the first FM layer. When the spin polarized current is transmitted through a polarization preservation spacer, the spin angular moment of electrons incident on a second FM layer interacts with magnetic moments of the second FM layer near the interface between the second FM layer and non-magnetic spacer. Through this interaction, the electrons transfer a portion of their angular momentum to the second FM layer. As a result, spin-polarized current can switch the magnetization direction of the second FM layer if the current density is sufficiently high.

Spin Hall Effect (SHE) is a physics phenomenon discovered in the mid $20^{th}$ century, and is described by M. Dyaknov et al. in Physics Lett. A, Vol. 35, 459 (1971). Similar to a regular Hall Effect where conduction carriers with opposite charges are scattered to opposite directions perpendicular to the current density due to a certain scattering mechanism, SHE causes electrons with opposite spins to be scattered to opposite directions perpendicular to the charge current density as a result of strong spin-orbit coupling in the conducting layer. As shown in FIG. 1, electrons pass through a non-magnetic conductor 2 with strong spin orbit interaction, and electrons 3a with spin in the negative x-axis direction are deflected to the +z-axis surface 2s1 while electrons 3b with spin in the positive x-axis direction are deflected to the negative z-axis surface 2s2. SHE is quantified by the Spin Hall Angle (SHA) defined as the ratio of the spin current in the direction transverse to the charge current (z-axis in FIG. 1A) to the charge current (y-axis direction in FIG. 1A). For many years after SHE was discovered, the absolute value of SHA materials evaluated was typically <0.01, and SHE had very limited applications in industry.

During the past 10 years, materials with substantially larger (giant) SHA have been found. B. Gu et al. in Phys. Rev. Lett. 105, 216401 (2010), and L. Liu et al. in Phys. Rev. Lett. 106, 036601 (2011) provided examples of SHA ~0.07 in a Pt layer, and as large as 0.12 in a Au layer with Pt doping, and an application where giant transverse spin current is injected into an adjacent magnetic layer to induce reversal and ferromagnetic resonance by spin torque. A large but negative SHA of around −0.12 was found in β-Ta, meaning that electrons in the β-Ta layer are spin scattered in the opposite directions compared to what is shown in FIG. 1. SHE with the negative SHA material was also used to interact with an adjacent magnetic layer, and even flip a magnetization in a magnetic layer in a magnetic random access memory (MRAM) device without sending a current through the magnetic tunnel junction. The aforementioned applications using SHE, or spin orbit torque (SOT) in MRAM, are typically called SOT-MRAM, and can significantly reduce the reliability concern that is generally found in conventional spin torque transfer (STT)-MRAM.

All existing designs that assist magnetic recording have advantages, but also have disadvantages including a greater number of pads per head for all assisted designs, reliability concern for TAMR, and a limited WG to fit a multilayer device in both MAMR and TAMR. Furthermore, a new assist scheme is desired where there is no current density threshold to initiate the assist mechanism, and where the stack of layer(s) used to provide the assist is formed with fewer process steps than in existing designs where a spin torque oscillator (STO) in MAMR or STRAMR usually has three or more layers.

SUMMARY

One objective of the present disclosure is to provide a SHE assisted magnetic recording scheme that provides better overwrite (OW), bit error rate (BER), and transition sharpness compared with existing magnetic recording assist designs.

A second objective of the present disclosure is to provide the SHE assisted magnetic recording (SHAMR) scheme of the first objective that also enables better device reliability and requires fewer fabrication steps than for STO devices.

A third objective of the present disclosure is to provide a SHAMR scheme that satisfies the first two objectives and also does not have a current threshold to begin the assist, or require additional pads for electrical connections.

According to a first embodiment of the present disclosure, these objectives are achieved by forming a SHE layer in a write gap, and with a bottom surface that interfaces with a MP trailing side, and having a top surface that contacts a trailing shield (TS). The SHE layer may be made of a positive giant SHA material such as Pt or a negative giant SHA material such as β-Ta, and has a front side at the ABS. Preferably, the SHE layer is comprised of a so-called giant SHA material having an absolute value for SHA that is >0.05. The backside of the SHE layer may be at a height equal to the throat height (TH) of the PMR writer, or at a height unequal to TH in other embodiments.

When a SHE layer made of a positive giant SHA material is in the write gap, a current ($I_{SHE}$) is applied in a cross-track direction (negative y-axis direction) through the SHE layer when MP magnetization is aligned out of the ABS (in a negative x-axis direction) toward a magnetic medium during a write process. Alternatively, $I_{SHE}$ is applied in a positive y-axis direction and with MP magnetization in the negative x-axis direction when a negative giant SHA material is employed. Moreover, the write current (Iw) waveform is synchronized with $I_{SHE}$ during the writing of each transition so that the direction of Iw and $I_{SHE}$ are reversed simultaneously for each transition, and the writer's rise time is shortened. The SHE layer is insulated from other conducting layers including the side shields and leading shield to prevent electrical shorts.

Without a current in the SHE layer, the MP has a local magnetization at the MP/SHE interface that is aligned substantially in the direction of the write gap field ($H_{WG}$) that is either toward or from the trailing shield. Similarly, the TS has a local magnetization at the TS/SHE layer interface that is substantially parallel to that of the local MP magnetization and to $H_{WG}$. The advantages of the present disclosure are realized when $I_{SHE}$ is applied and synchronized with Iw. Accordingly, the SHE layer exerts a transverse spin transfer torque toward the MP/SHE layer interface that causes the MP local magnetization to tilt down and more towards the ABS, or more away from the ABS depending on the transition. Similarly, transverse spin transfer torque is applied toward the TS/SHE layer interface that tilts the local TS magnetization up and away from the ABS, or toward the ABS depending on the transition. The result is a higher effective write field for better overwrite, and a higher TS return field that typically correlates to better BER. Within a SHE layer that is a positive giant SHA material, an Oersted field is also generated at the interfaces with the MP and TS that reinforces the transverse spin transfer torque to further boost the write field and return field, respectively. However, if a SHE layer that is a negative giant SHA material is used, the Oersted field cancels some of the transverse spin torque from the SHE layer, but the cancellation effect is small due to the transverse spin transfer torque having a substantially greater magnitude than the Oersted field.

In other embodiments, an insulating portion of the write gap is formed between the SHE layer top surface and TS so that the SHE layer contacts the MP, and provides a transverse spin transfer torque only to the local MP magnetization when Iw is synchronized with $I_{SHE}$. Optionally, an insulating portion of the write gap is formed between the SHE layer bottom surface and MP so that the SHE layer contacts the TS, and provides a transverse spin transfer torque only to the local TS magnetization when Iw is synchronized with $I_{SHE}$.

In all of the aforementioned embodiments, the front side of the SHE layer may be recessed from the ABS. Furthermore, the SHE layer may be comprised of at least two sub-layers made of different SHA materials in order to tune the current density in each sub-layer, and the magnitude of the resulting transverse spin transfer torque. Thus, with one or both of a larger $I_{SHE}$ and a larger absolute value for SHA, the amount of transverse spin torque also increases in each embodiment. Preferably, the SHE layer has a full width in the cross-track direction such that the far sides thereof are aligned with the far sides of the side shields.

Depending on the resistance of the SHE layer and the leads, the SHE layer circuit used to apply $I_{SHE}$ may be in series or parallel with the Iw circuit. Optionally, the $I_{SHE}$ circuit may be independent from the Iw circuit. The SHAMR ($I_{SHE}$) current input may be across pads shared with the Iw circuit to minimize the number of electrical contact pads required in the recording head. Since the current $I_{SHE}$ is confined within a single layer, there is no concern with electromigration that is a fail mechanism when current is applied perpendicular to the planes of several layers in a STO device in MAMR and STRAMR designs.

A method is provided for forming a full width SHE layer having a top surface contacting the trailing shield and a bottom surface that forms an interface with a MP trailing side.

DETAILED DESCRIPTION

Figure 1:
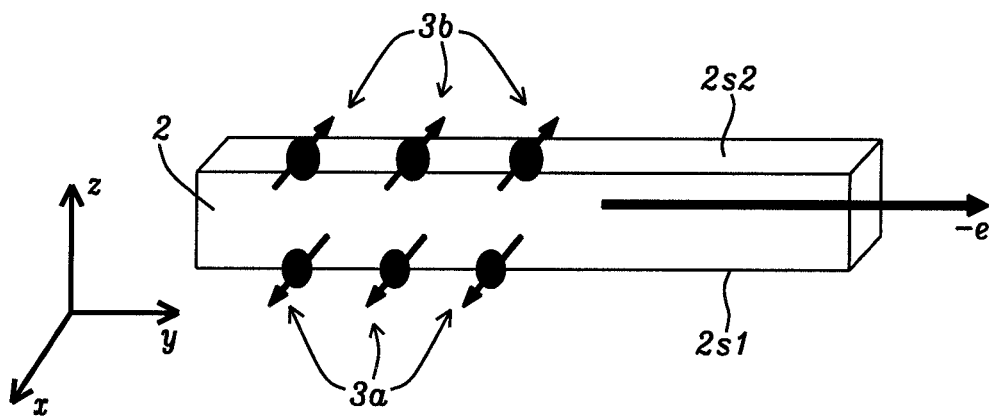
FIG. 1 is an oblique view of a conductor made of a Spin Hall Effect material where electrons with spin in the (−) x-axis direction are deflected to the (+) z-axis surface, and electrons with spin in the (+) x-axis direction are deflected to the (−) z-axis surface.

The present disclosure is a PMR writer based on SHAMR technology hereinafter referred to as a SHAMR device wherein a SHE layer is formed between a MP trailing side and a trailing shield so that when a current ($I_{SHE}$) is applied in a cross-track direction and is synchronized with Iw during a write process, a transverse spin transfer torque is applied in a down-track direction to one or both of a local MP magnetization at a MP/SHE layer interface, and to a local TS magnetization at a TS/SHE layer interface to enhance write field, and TS return field, respectively. In the drawings, the y-axis is in a cross-track direction, the z-axis is in a down-track direction, and the x-axis is in a direction orthogonal to the ABS and towards a back end of the writer structure. Thickness refers to a down-track distance, width is a cross-track distance, and height is a distance orthogonal to the ABS in the x-axis direction. In some of the drawings, a magnetic bit is considerably enlarged over actual size in order to more easily depict a bit magnetization therein. The terms "magnetic moment" and "magnetization" may be used interchangeably. The term "down" with respect to MP field direction indicates a direction out of the ABS toward the magnetic medium, and the term "up" refers to a direction opposite to "down", which is into the MP from the magnetic medium.

Figure 2:
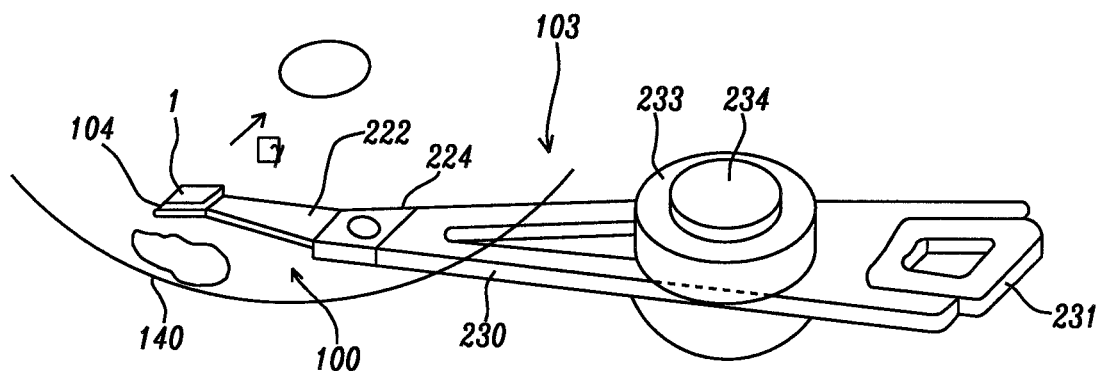
FIG. 2 is a perspective view of a head arm assembly of the present disclosure.

Referring to FIG. 2, a head gimbal assembly (HGA) 100 includes a magnetic recording head 1 comprised of a slider and a PMR writer structure formed thereon, and a suspension 103 that elastically supports the magnetic recording head. The suspension has a plate spring-like load beam 222 formed with stainless steel, a flexure 104 provided at one end portion of the load beam, and a base plate 224 provided at the other end portion of the load beam. The slider portion of the magnetic recording head is joined to the flexure, which gives an appropriate degree of freedom to the magnetic recording head. A gimbal part (not shown) for maintaining a posture of the magnetic recording head at a steady level is provided in a portion of the flexure to which the slider is mounted.

HGA 100 is mounted on an arm 230 formed in the head arm assembly 103. The arm moves the magnetic recording head 1 in the cross-track direction y of the magnetic recording medium 140. One end of the arm is mounted on base plate 224. A coil 231 that is a portion of a voice coil motor is mounted on the other end of the arm. A bearing part 233 is provided in the intermediate portion of arm 230. The arm is rotatably supported using a shaft 234 mounted to the bearing part 233. The arm 230 and the voice coil motor that drives the arm configure an actuator.

Figure 3:
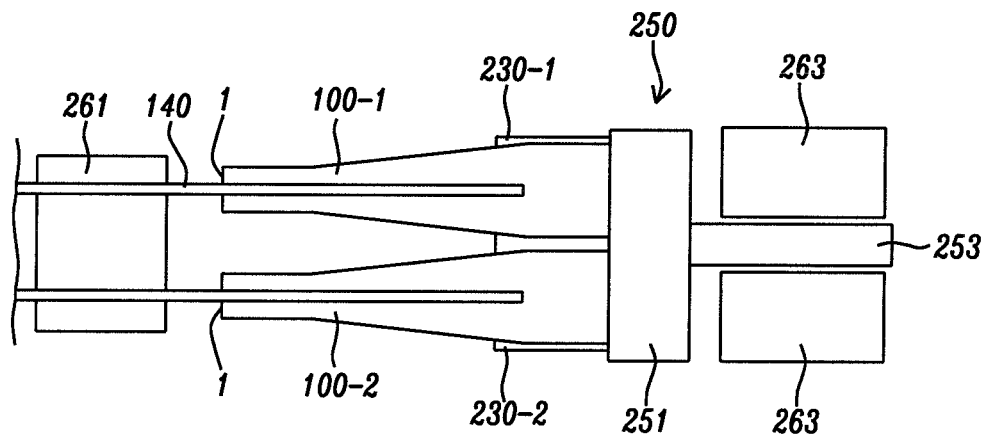
FIG. 3 is side view of a head stack assembly of the present disclosure.

Next, a side view of a head stack assembly (FIG. 3) and a plan view of a magnetic recording apparatus (FIG. 4) wherein the magnetic recording head 1 is incorporated are depicted. The head stack assembly 250 is a member to which a first HGA 100-1 and second HGA 100-2 are mounted to arms 230-1, 230-2, respectively, on carriage 251. A HGA is mounted on each arm at intervals so as to be aligned in the perpendicular direction (orthogonal to magnetic medium 140). The coil portion (231 in FIG. 2) of the voice coil motor is mounted at the opposite side of each arm in carriage 251. The voice coil motor has a permanent magnet 263 arranged at an opposite position across the coil 231.

Figure 4:
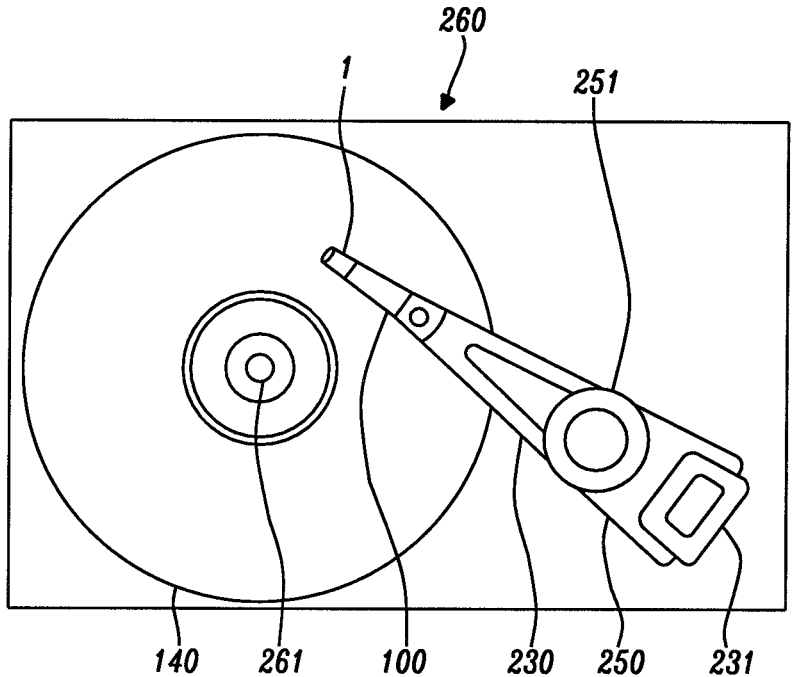
FIG. 4 is a plan view of a magnetic recording apparatus of the present disclosure.

With reference to FIG. 4, the head stack assembly 250 is incorporated in a magnetic recording apparatus 260. The magnetic recording apparatus has a plurality of magnetic media 140 mounted to spindle motor 261. For every magnetic recording medium, there are two magnetic recording heads arranged opposite one another across the magnetic recording medium. The head stack assembly and actuator except for the magnetic recording heads 1 correspond to a positioning device, and support the magnetic recording heads, and position the magnetic recording heads relative to the magnetic recording medium. The magnetic recording heads are moved in a cross-track of the magnetic recording medium by the actuator. The magnetic recording head records information into the magnetic recording media with a PMR writer element (not shown) and reproduces the information recorded in the magnetic recording media by a magnetoresistive (MR) sensor element (not shown).

Figure 5:
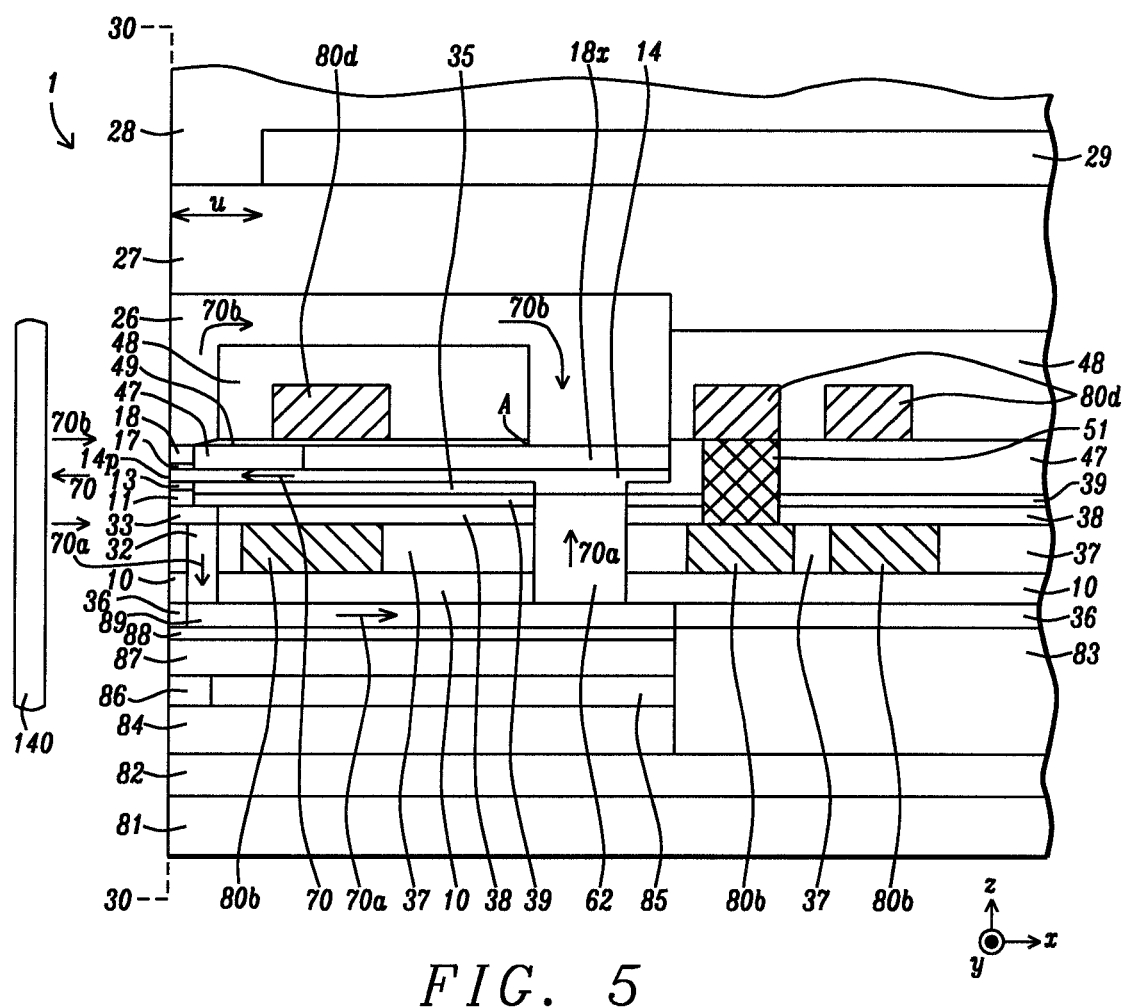
FIG. 5 is a down-track cross-sectional view of a combined read-write head with leading and trailing loop pathways for magnetic flux return to the main pole according to an embodiment of the present disclosure.

Referring to FIG. 5, magnetic recording head 1 comprises a combined read-write head. The down-track cross-sectional view is taken along a center plane (44-44 in FIG. 6A) formed orthogonal to the ABS 30-30, and that bisects the main pole layer 14. The read head is formed on a substrate 81 that may be comprised of AlTiC (alumina+TiC) with an overlying insulation layer 82 that is made of a dielectric material such as alumina. The substrate is typically part of a slider formed in an array of sliders on a wafer. After the combined read head/write head is fabricated, the wafer is sliced to form rows of sliders. Each row is typically lapped to afford an ABS before dicing to fabricate individual sliders that are used in a magnetic recording device. A bottom shield 84 is formed on insulation layer 82.

A magnetoresistive (MR) element also known as MR sensor 86 is formed on bottom shield 84 at the ABS 30-30 and typically includes a plurality of layers (not shown) including a tunnel barrier formed between a pinned layer and a free layer where the free layer has a magnetization (not shown) that rotates in the presence of an applied magnetic field to a position that is parallel or antiparallel to the pinned layer magnetization. Insulation layer 85 adjoins the backside of the MR sensor, and insulation layer 83 contacts the backsides of the bottom shield and top shield 87. The top shield is formed on the MR sensor. An insulation layer 88 and a top shield (S2B) layer 89 are sequentially formed on the top magnetic shield. Note that the S2B layer 89 may serve as a flux return path (RTP) in the write head portion of the combined read/write head. Thus, the portion of the combined read/write head structure formed below layer 89 in FIG. 5 is typically considered as the read head. In other embodiments (not shown), the read head may have a dual reader design with two MR sensors, or a multiple reader design with multiple MR sensors.

The present disclosure anticipates that various configurations of a write head (SHAMR writer) may be employed with the read head portion. In the exemplary embodiment, magnetic flux 70 in main pole (MP) layer 14 is generated with flowing a write current called Iw (not shown) through bucking coil 80b and driving coil 80d that are below and above the main pole layer, respectively, and are connected by interconnect 51. Magnetic flux 70 exits the main pole layer at pole tip 14p at the ABS 30-30 and is used to write a plurality of bits on magnetic media 140. Magnetic flux 70b returns to the main pole through a trailing loop comprised of trailing shield 17, write shield 18, PP3 shield 26, and top yoke 18x. There is also a leading return loop for magnetic flux 70a that includes leading shield 11, leading shield connector (LSC) 33, S2 connector (S2C) 32, return path 89, and back gap connection (BGC) 62. The magnetic core may also comprise a bottom yoke 35 below the main pole layer. Dielectric layers 10, 11, 13, 36-39, and 47-49 are employed as insulation layers around magnetic and electrical components. A protection layer 27 covers the PP3 trailing shield and is made of an insulating material such as alumina. Above the protection layer and recessed a certain distance u from the ABS 30-30 is an optional cover layer 29 that is preferably comprised of a low coefficient of thermal expansion (CTE) material such as SiC. Overcoat layer 28 is formed as the uppermost layer in the write head.

Figure 6A:
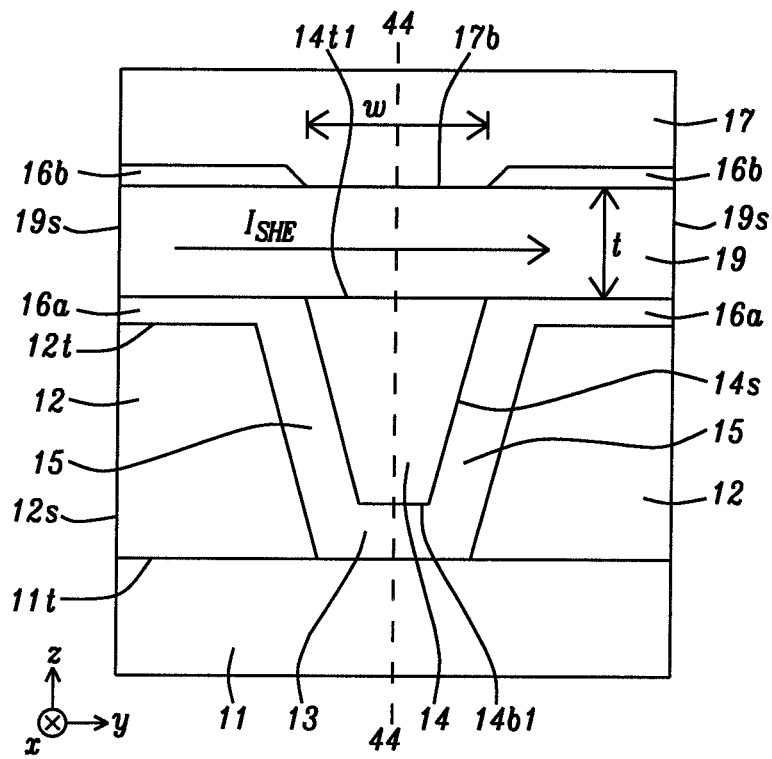
FIG. 6A is an ABS view of a PMR writer according to an embodiment of the present disclosure where a single SHE layer is formed in the write gap and has a top surface contacting a TS, and a bottom surface adjoining the MP trailing side.

Referring to FIG. 6A, an ABS view of the SHAMR write head structure proximate to the main pole (MP) 14 is depicted according to an embodiment of the present disclosure. There is a side gap 15 adjoining MP side 14s on each side of center plane 44-44. Each side shield (SS) has an inner side adjoining a side gap, and an outer side 12s. A first write gap (WG) layer 16a is formed on SS top surface 12t, and has a top surface coplanar with a front edge of MP trailing side 14t1 at the ABS. Leading shield 11 has top surface 11t contacting a bottom of each side shield, and a bottom of lead gap 13. The lead gap fills the space between MP leading side 14b1 and the leading shield. A key feature is SHE layer 19 formed on the MP trailing side, and on WG layer 16a on each side of the center plane. TS 17 has a bottom surface 17b contacting a center portion of the SHE layer in a region of width w of about 30 nm to 150 nm that is bisected by the center plane. A second WG layer 16b is formed on outer portions of the SHE layer top surface at distances greater than ½w from the center plane. $I_{SHE}$ is synchronized with Iw (not shown) as explained later and is in a cross-track direction orthogonal to the center plane.

Figure 6B:
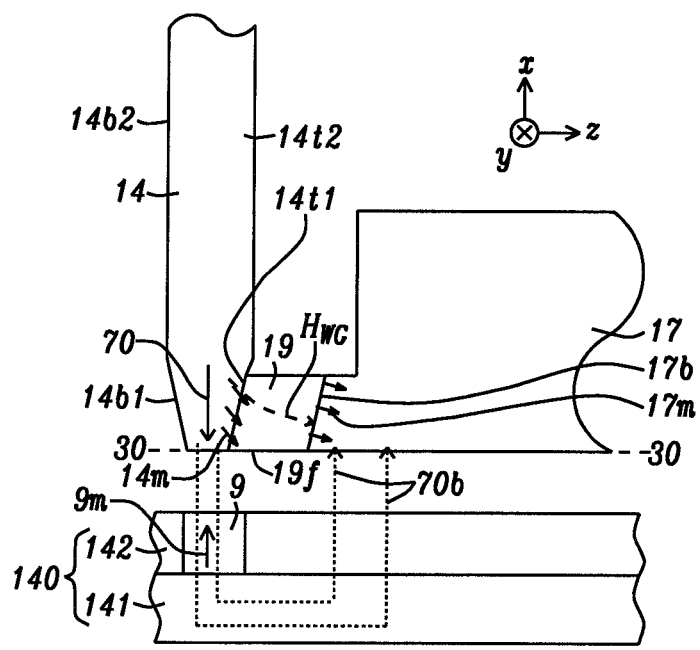
FIG. 6B is a down-track cross-sectional view at the center plane of the PMR writer in FIG. 6A according to an embodiment of the present disclosure.

As shown in FIG. 6B, MP 14 has a sufficiently large magnetic (write) field 70 to write a media bit 9 with magnetization 9m on medium 140. In a normal write process, the MP needs to be driven with a coil current so that the MP write field 70 is pointing down to overwrite a medium bit 9 pointing up. Magnetic flux in the MP write field proceeds from the MP through the ABS 30-30 and into medium bit layer 142 and soft underlayer (SUL) 141. A portion of the flux 70b is collected by trailing shield 17 and then returns to the MP through a trailing loop (shown in FIG. 5). SHE layer 19 has a front side 19f at the ABS, and a bottom surface formed on the MP tapered trailing side 14t1, which connects with a MP top surface 14t2 that is aligned orthogonal to the ABS. The SHE layer also has a top surface that adjoins TS bottom surface 17b. The MP leading side 14b1 is generally tapered and connects with the MP bottom surface 14b2. Write gap field $H_{WG}$ is shown across the SHE layer in a direction from the MP to trailing shield (TS) 17. Thus, a local MP field 14m proximate to MP trailing side 14t1, and a local TS field 17m proximate to the TS bottom surface are pointing substantially in the same direction as $H_{WG}$.

Figure 7A:
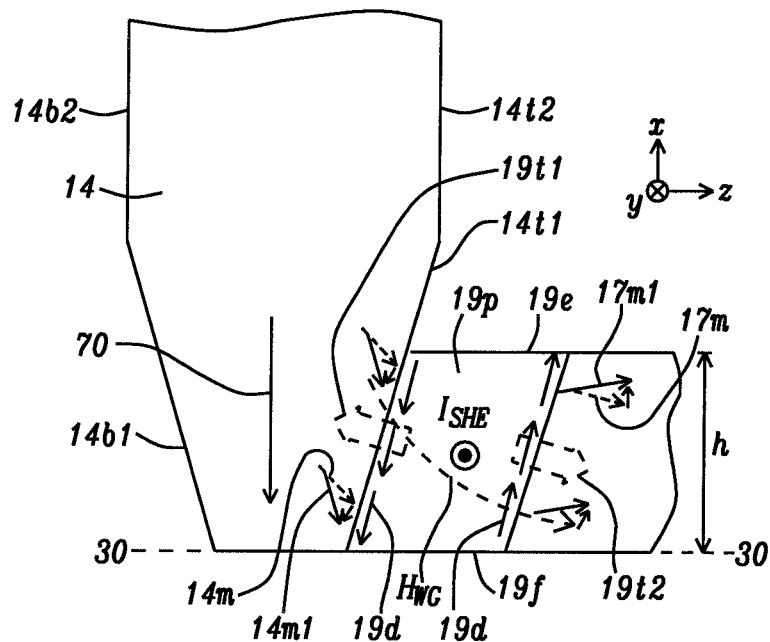
FIG. 7A and FIG. 7B show a transverse spin transfer torque applied to a MP magnetization and to a TS magnetization at interfaces with a positive giant SHE layer having a current flow out of the plane of the paper, and with a negative giant SHE layer having a current flow into the plane of the paper, respectively, according to an embodiment of the present disclosure.

Referring to FIG. 7A, a down-track cross-sectional view of the PMR writer in FIGS. 6A-6B is shown according to a first embodiment of the present disclosure where a single SHE layer 19p made of a positive giant SHA material contacts the MP trailing side 14t1 and TS bottom surface 17b, has a front side 19f at the ABS, and a backside 19e essentially at the same throat height h as that of the TS. In other embodiments, backside 19e may be at a height less than h. When current Iw induces a MP write field 70 pointing out of the ABS 30-30 toward a magnetic medium (not shown), current $I_{SHE}$ is applied in the SHE layer in a cross-track direction that is out of the plane of the paper in order to generate a transverse spin transfer torque 19t1 that is substantially orthogonal to MP trailing side 14t1, and a transverse spin transfer torque 19t2 that is substantially orthogonal to TS bottom surface 17b. In the exemplary embodiment, $I_{SHE}$ is in the negative cross-track (y-axis) direction.

Local MP magnetization 14m is generally in the same direction as the write gap field $H_{WG}$ before $I_{SHE}$ is applied and synchronized with Iw as explained layer. As a result of transverse spin transfer torque 19t1, the local MP magnetization is tilted downward indicated by arrow 14m1 and effectively enhances the write field. Simultaneously, transverse spin transfer torque 19t2 tilts local TS magnetization 17m upward indicated by arrow 17m1, which enhances the TS return field (70b in FIG. 6B). Note that the Oersted field 19d is produced within the SHE layer and adjacent to MP trailing side 14t1 and TS bottom surface 17b, and also provides a assist effect (smaller than the SHE assist) in enhancing the write field 70 and TS return field since the Oersted field direction tends to tilt local MP magnetization downward and tilt local TS magnetization 17m upward.

The mechanism for the SHE assist is explained as follows. Conduction electrons in $I_{SHE}$ that carry spin downward propagate to the MP trailing side 14t1, and conduction electrons with upward spin propagate to the TS bottom surface 17b. The spin angular momentum of the downward spin current interacts with the local MP magnetization 14m as depicted by transverse spin transfer torque 19t1. Meanwhile, spin angular momentum of the upward spin current interacts with local TS magnetization 17m as shown by transverse spin transfer torque 19$t$2. The resulting increase in TS return field typically correlates to improved BER. Moreover, as the SHE rise time is around 1 picosecond to tens of picoseconds and substantially shorter than the writer's rise time, the PMR writer transition speed will be significantly improved with the SHE assist as described with respect to FIG. 15 in a later section. The write pattern's transition sharpness will also be improved. Preferably, SHE thickness t depicted in FIG. 6A is less than or equal to the WG thickness, and more preferably <12 nm since the L. Liu reference mentioned earlier indicates that a SHE assist (transverse spin torque applied to an adjacent magnetic layer) is reduced when the giant SHA material has a thickness >12 nm.

Figure 7B:
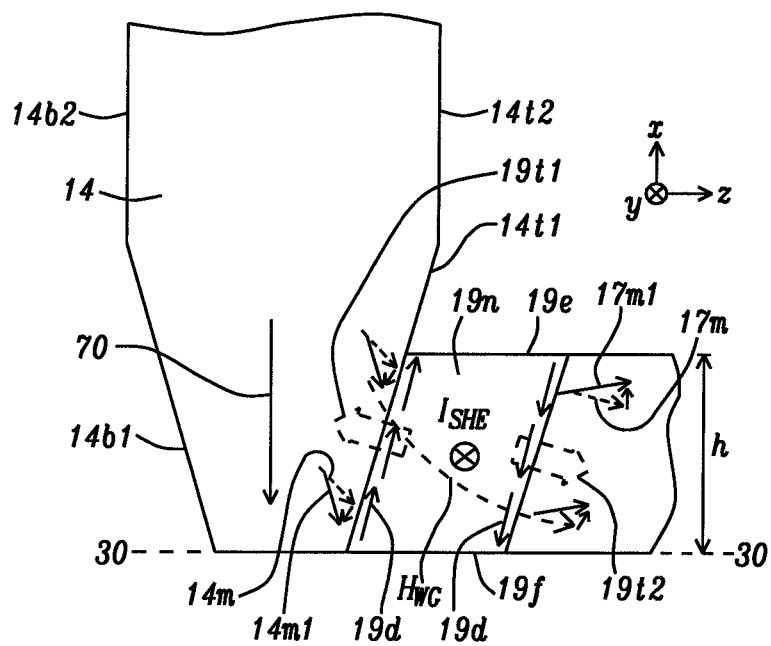

As shown in FIG. 7B, the present disclosure also encompasses an embodiment where SHE layer 19$p$ is replaced by SHE layer 19$n$ that is made of a negative giant SHA material. The same advantageous results of enhanced write field and better TS return field are realized as in FIG. 7A. However, $I_{SHE}$ must be applied through the SHE layer in a direction that is into the plane of the paper when the MP write field 70 is out of the ABS 30-30 and toward a magnetic medium (not shown). In the exemplary embodiment, $I_{SHE}$ is in the positive cross-track direction. Again, transverse spin transfer torque 19$t$1 and 19$t$2 are produced and tilt the local MP magnetization downward from initial position 14$m$ to position 14$m$1, and tilt local TS magnetization upward from initial position 17$m$ to 17$m$1, respectively, when $I_{SHE}$ is synchronized with Iw. However, in this case, the Oersted field 19$d$ proximate to MP trailing side 14$t$1 and adjacent to TS bottom surface 17$b$ is substantially in the opposite direction to magnetizations 14$m$1 and 17$m$1, respectively. Accordingly, a small portion of the SHE assist from spin transfer torque 19$t$1 and 19$t$2 is cancelled because of the opposing Oersted field.

Unlike a current threshold requirement for assist effects to occur with SOT-MRAM or STT-MRAM, there is no $I_{SHE}$ current threshold in the SHAMR embodiments of the present disclosure. This advantage is related to the fact that injected spin current from the SHE layer to the MP 14 and TS 17 always carries spin direction parallel to the MP/SHE and SHE/TS interfaces and is substantially orthogonal to the local MP magnetization 14$m$ and local TS magnetization 17$m$, respectively. The magnitude of the transverse spin transfer torque increases as $I_{SHE}$ is increased. Maximum spin transfer occurs when local MP magnetization 14$m$1 is parallel to MP trailing side 14$t$1, and when local TS magnetization 17$m$1 is parallel to TS bottom surface 17$b$.

Figure 7C:
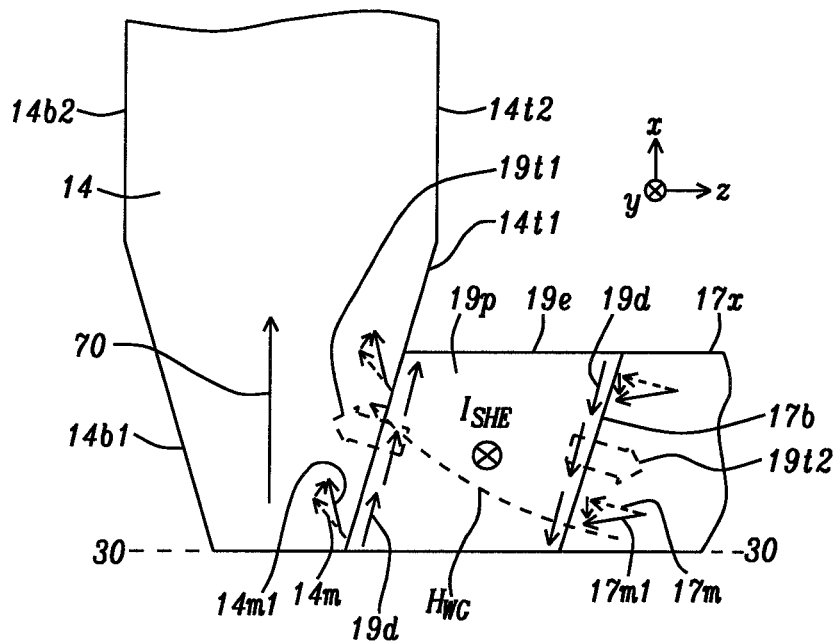
FIG. 7C and FIG. 7D show how the current flow in the SHE layer in FIG. 7A and FIG. 7B, respectively, is reversed when the MP write field is reversed from a direction pointing down to an up direction.

Referring to FIG. 7C, during a transition when the MP 14 has a write field 70 pointing up (away from the ABS 30-30 and opposite to the FIG. 7A embodiment) in order to overwrite a magnetic bit (not shown) pointing down (away from the ABS), the current in SHE layer 19$p$ is reversed compared with FIG. 7A, and is into the plane of the paper in order to generate a transverse spin transfer torque 19$t$1 that together with Oersted field 19$d$ tilts the local MP magnetization 14$m$ upward to yield MP magnetization 14$m$1 that enhances the write field. Similarly, transverse spin transfer torque 19$t$2 is exerted substantially orthogonal to the SHE/TS interface and together with Oersted field 19$d$ tilts local TS magnetization 17$m$ downward to give TS magnetization 17$m$1.

Figure 7D:
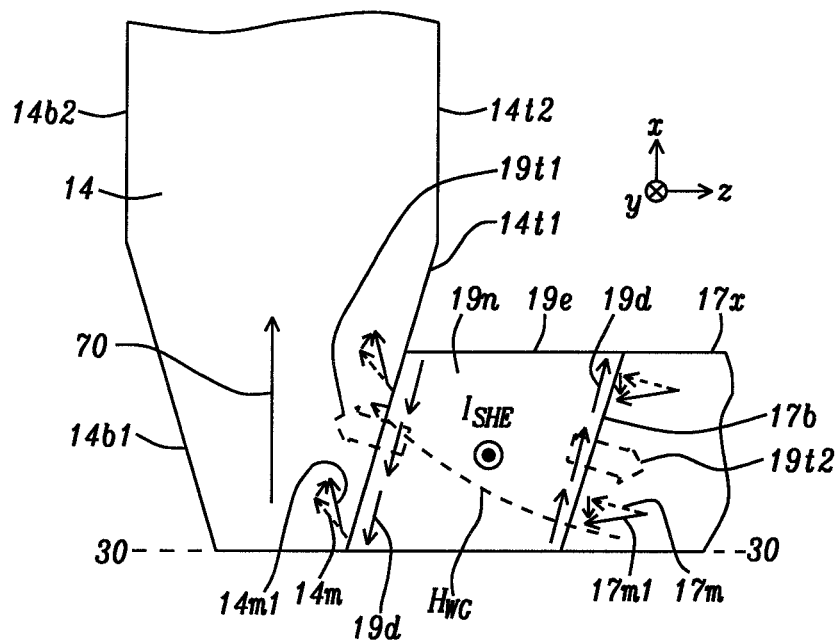

In FIG. 7D, all aspects of the embodiment in FIG. 7C are retained except the (+) SHE layer is replaced with a negative giant SHA material to give SHE layer 19$n$. Accordingly, the current in SHE layer 19$n$ is reversed compared with FIG. 7B, and is out of the plane of the paper in order to generate a transverse spin transfer torque 19$t$1. Again, the Oersted field 19$d$ is generally in the opposite direction to MP magnetization 14$m$1 and tends to cancel a portion of the SHE assist. Similarly, transverse spin transfer torque 19$t$2 is exerted substantially orthogonal to the SHE/TS interface while Oersted field 19$d$ that is proximate to TS bottom surface 17$b$ tends to be generally in the opposite direction to TS magnetization 17$m$1 thereby cancelling a minor portion of the SHE effect.

In all of the aforementioned embodiments, the Oersted field 19$d$ is on the order of tens of Oe, and is considerably less than the SHE assist (transverse spin transfer torque 19$t$1 and 19$t$2) when the SHE layer is comprised of a giant SHA material.

Figure 8A:
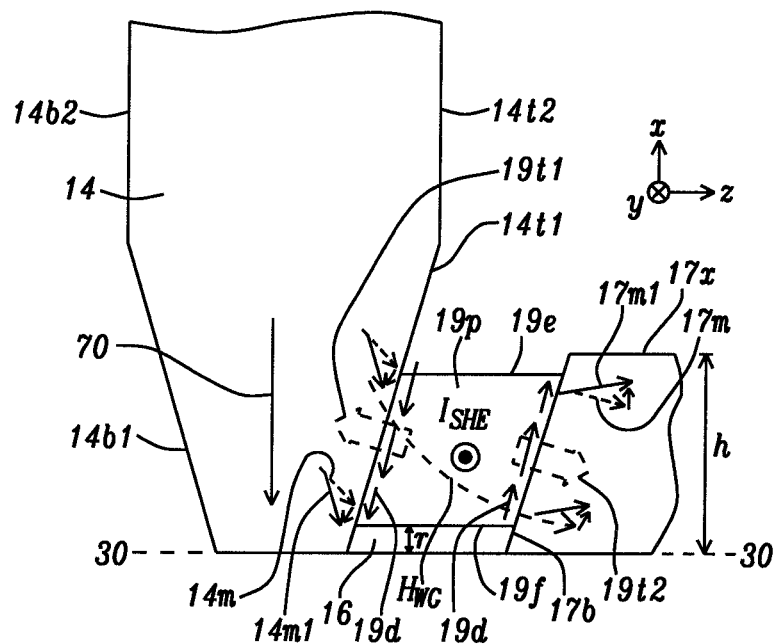
FIG. 8A and FIG. 8B are alternative embodiments to FIG. 7A and FIG. 7B, respectively, where the SHE layer has a front side that is recessed behind the ABS, and a backside at a different height than that of the TS backside.

Referring to FIG. 8A, a second embodiment of the present disclosure is depicted where SHE layer 19$p$ described previously is modified so that the front side 19$f$ is recessed a distance r of 20 nm to 80 nm from the ABS 30-30, and preferably <60 nm. SHE backside 19$e$ may be at a height less than h (typically ≤80 nm) for TS backside 17$x$. Otherwise, all aspects of the first embodiment are retained including generation of transverse spin transfer torque 19$t$1 and 19$t$2 on local MP magnetization 14$m$ and local TS magnetization 17$m$, respectively, such that the resulting MP magnetization 14$m$1 enhances write field 70, and TS magnetization 17$m$1 boosts the TS return field.

Figure 8B:
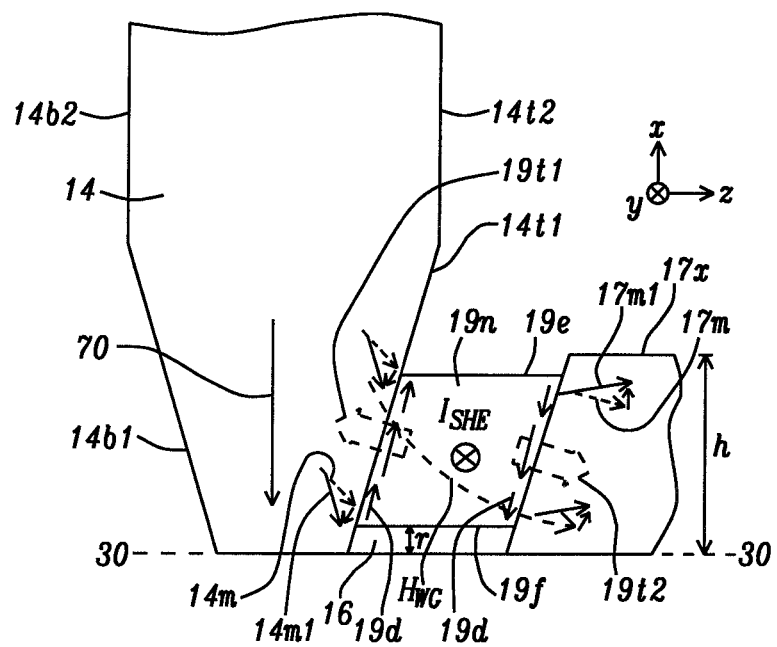

Similarly, in FIG. 8B, SHE layer 19$n$ described previously with regard to FIG. 7B may be modified to have front side 19$f$ recessed from the ABS 30-30, and with a backside that is unequal to height h of the TS backside 17$x$. All aspects and advantages of the first embodiment are substantially retained with the recessed SHE layer. Furthermore, there is expected to be less wear and improved reliability when the SHE layer is recessed from the ABS. In this case, a portion of WG 16 is formed between the ABS and SHE front side 19$f$.

Figure 9A:
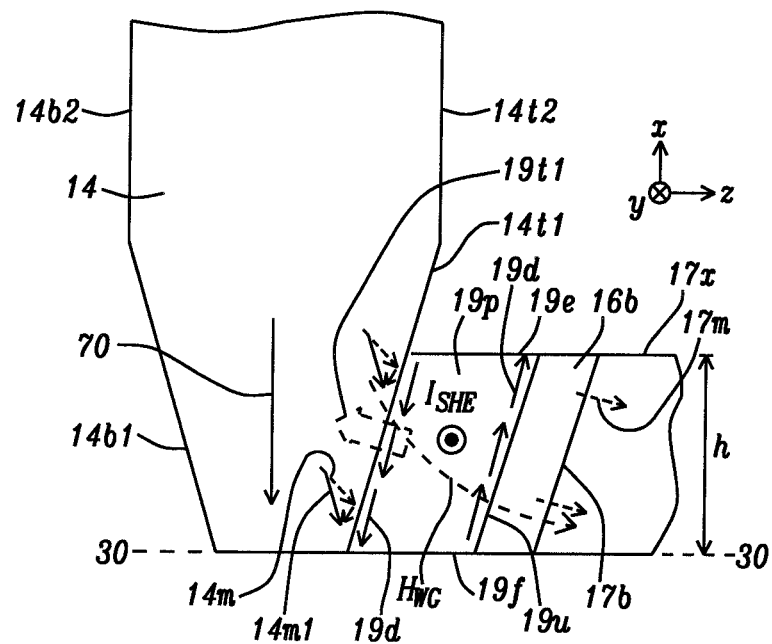
FIG. 9A and FIG. 9B are alternative embodiments to FIG. 7A and FIG. 7B, respectively, where the SHE layer adjoins the MP trailing side but is separated from the TS by a portion of the write gap so that transverse spin transfer torque is applied only to a local MP magnetization at the interface with the SHE layer.

In FIG. 9A, a third embodiment of the present disclosure is illustrated and is a modification of SHE layer 19$p$ in the first embodiment where the SHE layer has a front side 19$f$ at the ABS and a bottom surface contacts MP trailing side 14$t$1. Here, WG layer 16$b$ is formed between SHE layer top surface 19$u$ and TS bottom surface 17$b$. The WG layer has sufficient thickness such that when current $I_{SHE}$ is applied out of the plane of the paper, local TS magnetization 17$m$ remains substantially parallel to $H_{WG}$, and is not influenced by transverse spin transfer torque from the SHE layer. Thus, $I_{SHE}$ is in a negative cross-track direction when the write field 70 is in the direction from MP 14 to the magnetic medium (not shown). However, transverse spin transfer torque 19$t$1 is still present and is responsible for tilting local MP magnetization 14$m$ to position 14$m$1 that is more parallel to the MP trailing side thereby enhancing the write field. Although SHE layer backside 19$e$ is depicted at height h equivalent to that of TS backside 17$x$, the SHE layer backside may be unequal to h in other embodiments. As indicated earlier, a SHE layer with a down-track thickness <12 nm is preferred for an optimum assist. Moreover, a reduced SHE layer thickness is especially desirable for advanced writers where WG thickness shrinks to 10 nm or less.

WG 16$a$/16$b$ (or WG 16 in other embodiments) may be a single layer or multilayer including but not limited to AlOx, SiOx, MgO, AlNx, TiOx, and other insulating oxides as well as metal oxynitrides and metal nitrides used in the art.

Figure 9B:
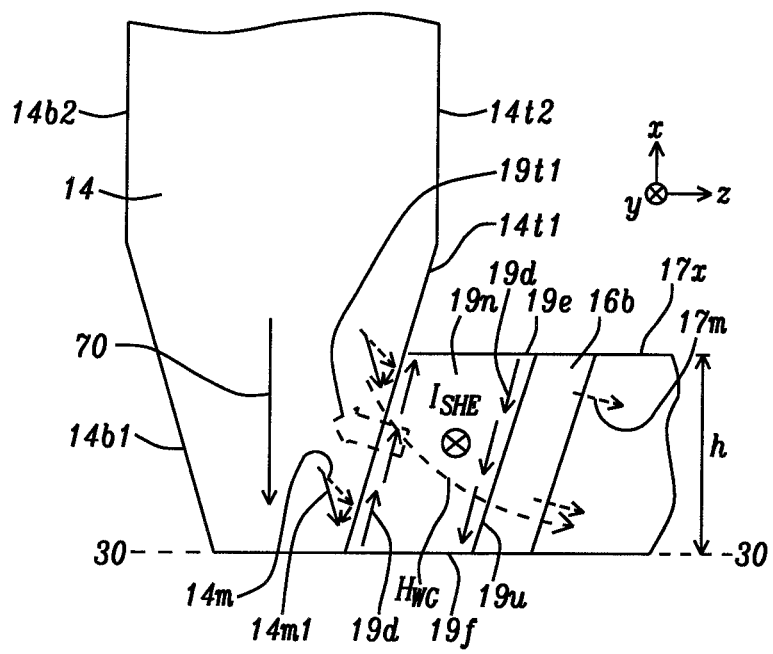

FIG. 9B illustrates an alternative third embodiment where SHE layer 19$n$ in the first embodiment is modified to have a top surface 19$u$ that is separated from TS bottom surface 17$b$ by WG layer 16$b$ of sufficient thickness to prevent transverse spin transfer torque from tilting local TS magnetization 17m. Since the SHE layer adjoins MP trailing side 14t1, transverse spin transfer torque 19t1 interacts with local MP magnetization 14m and tilts the MP magnetization to new position 14m1 that is more aligned with the MP trailing side. Accordingly, MP write field 70 is enhanced. Current $I_{SHE}$ is into the plane of the paper (positive cross-track direction) when the write field is out of the ABS 30-30 toward a magnetic medium (not shown). It should be understood in all embodiments that when the MP write field is in the reverse direction (pointing up and away from the ABS) rather than pointing down to the ABS, current $I_{SHE}$ is into the plane of the paper when there is a SHE layer 19p, and $I_{SHE}$ is out of the plane of the paper when SHE layer 19n is employed.

Figure 10A:
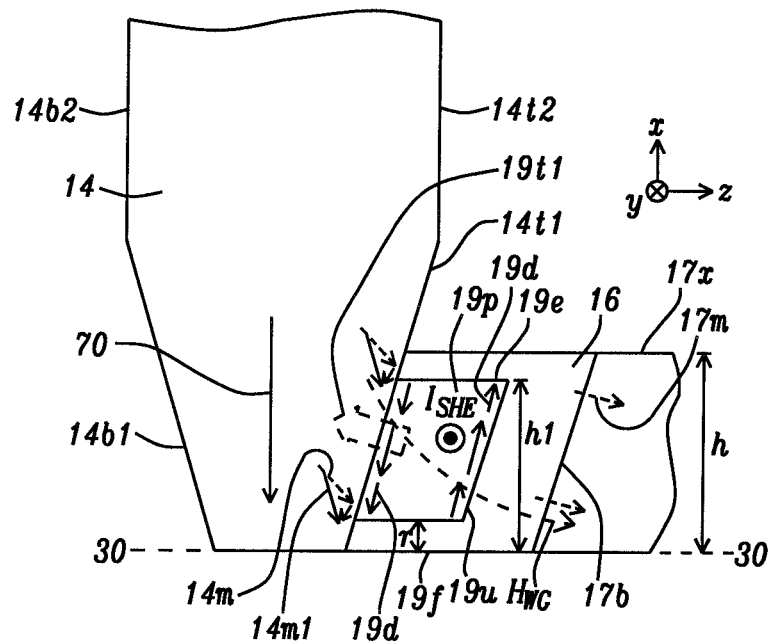
FIG. 10A and FIG. 10B are alternative embodiments to FIG. 8A and FIG. 8B, respectively, where the recessed SHE layer adjoins the MP trailing side but is separated from the TS by a portion of the write gap so that transverse spin transfer torque is applied only to a MP magnetization at the interface with the SHE layer.

Referring to FIG. 10A, the present disclosure also anticipates a fourth embodiment where SHE layer 19p in the third embodiment has front side 19f that is recessed to height r from the ABS 30-30. Moreover, SHE backside 19e may be at height h1 where h1<h from the ABS. Optionally, the SHE backside is at height h. Here, WG layers 16a and 16b, when made of the same dielectric material, may be combined and shown as WG 16 that adjoins SHE layer backside, front side, and top surface 19u. This embodiment retains the advantages of the third embodiment where transverse spin transfer torque 19t1 is generated with current $I_{SHE}$ and together with Oersted field 19d tilts local MP magnetization 14m toward the ABS.

Figure 10B:
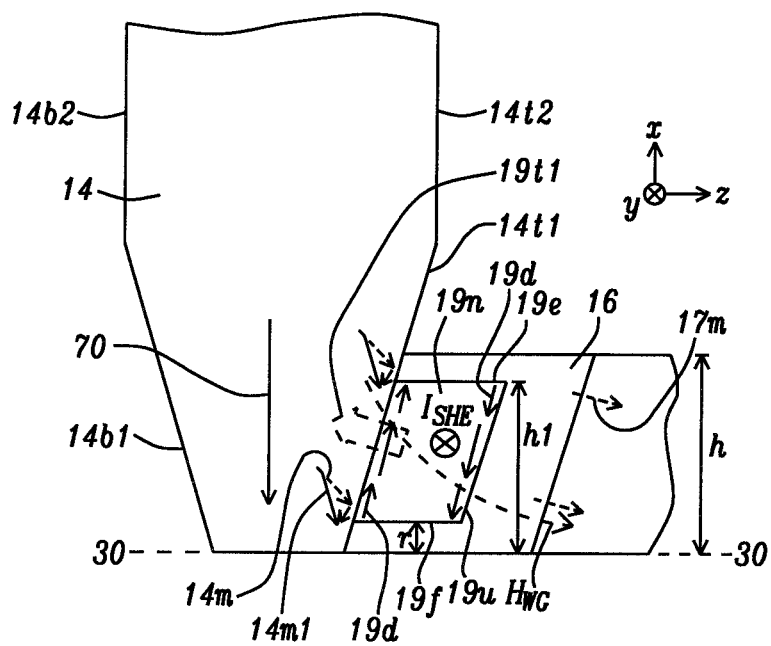

In FIG. 10B, SHE layer 19n in the third embodiment is modified to have a recessed front side 19f according to an alternative fourth embodiment. SHE backside may be at height h1, or optionally at height h. Because a sufficient thickness of WG 16 separates SHE top surface 19u from TS bottom surface 17b, there is no transverse spin transfer torque applied to local TS magnetization 17m. However, transverse spin transfer torque 19t1 tilts local MP magnetization 14m toward the ABS 30-30 to position 14m1 to enhance the write field 70.

Figure 11A:
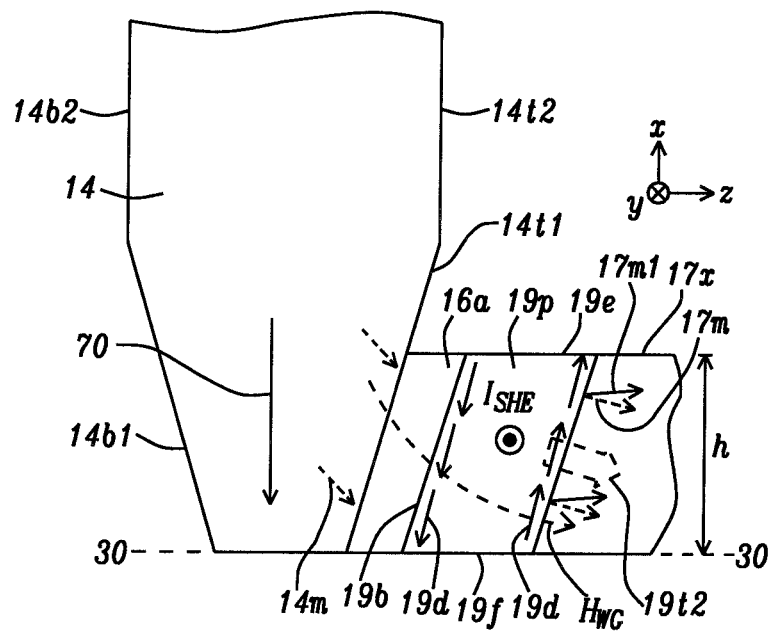
FIG. 11A and FIG. 11B are alternative embodiments to FIG. 7A and FIG. 7B, respectively, where the SHE layer adjoins the TS but is separated from the MP by a portion of the write gap so that transverse spin transfer torque is applied only to a local TS magnetization at the interface with the SHE layer.

Referring to FIG. 11A, a fifth embodiment of the present disclosure is shown and represents a modification of the first embodiment where all aspects are retained except WG layer 16a now separates SHE layer 19p from the MP trailing side 14t1. The SHE layer continues to contact TS bottom surface 17b and have front side 19f at the ABS 30-30. Although, SHE backside is at height h, the height may be unequal to h in other embodiments. The WG has sufficient thickness so that when current $I_{SHE}$ is applied out of the plane of the paper, local MP magnetization 14m remains substantially parallel to $H_{WG}$, and is not influenced by transverse spin transfer torque from the SHE layer. However, transverse spin transfer torque 19t2 is still effective and together with Oersted field 19d is responsible for tilting local TS magnetization 17m upward (away from the ABS) to position 17m1 thereby enhancing the TS return field (70b in FIG. 5).

Figure 11B:
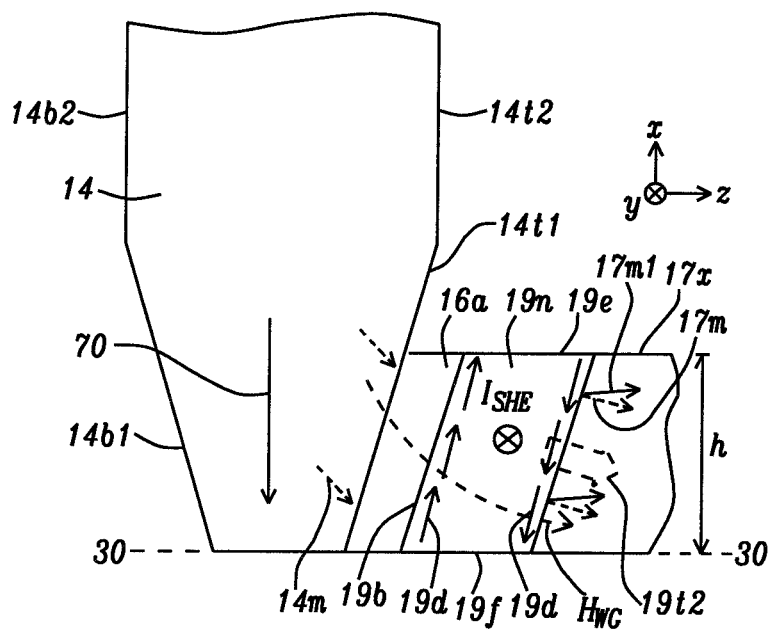

FIG. 11B illustrates an alternative fifth embodiment where SHE layer 19n in the first embodiment is modified to have a bottom surface 19b that is separated from MP trailing side 14t1 by WG layer 16a of sufficient thickness to prevent transverse spin transfer torque from tilting local MP magnetization 14m. Since the SHE layer adjoins the TS bottom surface 17b, transverse spin transfer torque 19t2 interacts with local TS magnetization 17m and tilts the TS magnetization upward (away from the ABS) to new position 17m1. Accordingly, the TS return field is enhanced. Current $I_{SHE}$ is into the plane of the paper when the MP write field 70 is out of the ABS 30-30 toward a magnetic medium (not shown). Since the SHE layer is a negative giant SHA material, the Oersted field 19d cancels a small portion of the SHE assist on TS magnetization in this embodiment.

Figure 12A:
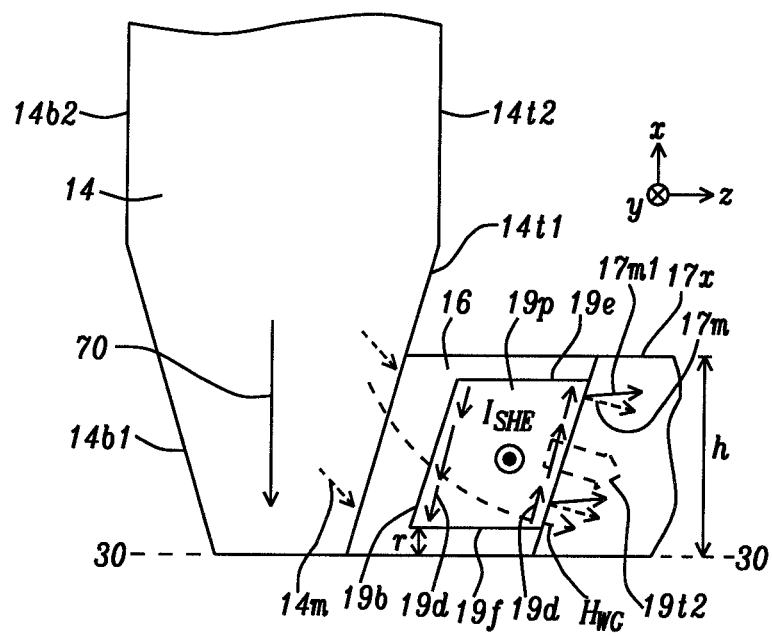
FIG. 12A and FIG. 12B are alternative embodiments to FIG. 8A and FIG. 8B, respectively, where the recessed SHE layer adjoins the TS but is separated from the MP by a portion of the write gap so that transverse spin transfer torque is applied only to a local TS magnetization at the interface with the SHE layer.

FIG. 12A illustrates a sixth embodiment that represents a modification of the fifth embodiment. In particular, SHE layer 19p now has front side 19f that is recessed to height r from ABS 30-30. SHE backside 19e may be at a height less than or equal to h. WG 16 separates MP trailing side 14t1 from SHE bottom surface 19b and has sufficient thickness to prevent transverse spin transfer torque (generated by applying $I_{SHE}$ through the SHE layer) and Oersted field 19d from acting on local MP magnetization 14m. Transverse spin transfer torque 19t2 is generated and together with Oersted field 19d interacts with local TS magnetization 17m to tilt said magnetization upward as indicated by TS magnetization 17m1. Thus, the TS return field is increased and improved BER is realized.

Figure 12B:
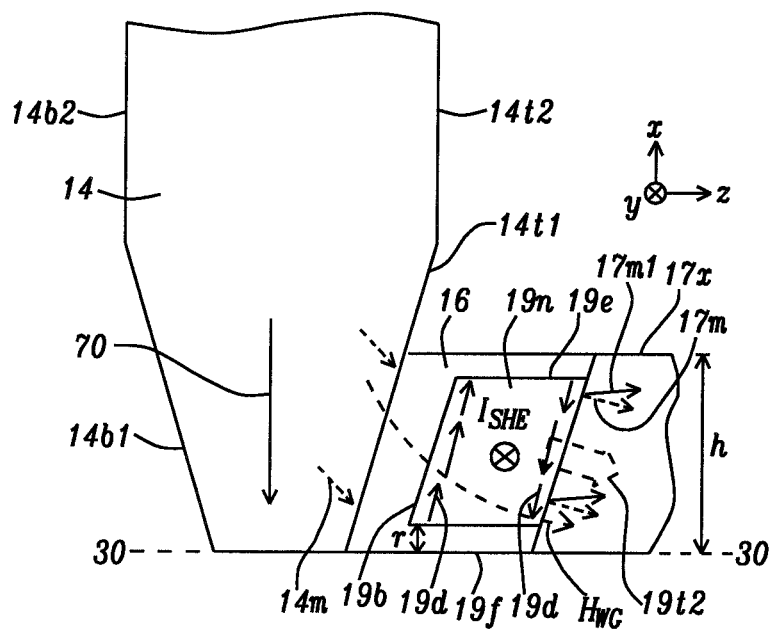

Referring to FIG. 12B, an alternative sixth embodiment is shown where all aspects of the SHAMR device in FIG. 12A are retained except a giant negative SHA material is substituted for a giant positive SHA material. Thus, SHE layer 19n is substituted for SHE layer 19p and $I_{SHE}$ is applied into the plane of the paper when MP write field 70 is out of the ABS 30-30 to a magnetic medium (not shown). Although no transverse spin transfer torque interacts with local MP magnetization 14m, the SHE layer generates transverse spin transfer torque 19t2 that tilts local TS magnetization 17m upward to yield TS magnetization 17m1. Again, the Oersted field 19d is generally in the opposite direction to TS magnetization 17m1 and thereby reduces a small portion of the SHE assist. Accordingly, the advantage of a substantial enhancement in TS return field is observed.

In the third through sixth embodiments, the WG layer 16a, 16b, or 16 preferably has a down-track thickness between the SHE layer 19p/19n and MP trailing side 14t1, or between the SHE layer and TS bottom surface 17b of at least 3 nm so to transverse spin torque does not interact on the local MP magnetization 14m and local TS magnetization 17m, respectively. However, the present disclosure anticipates that even a WG layer thickness greater than 0 nm but less than 3 nm may provide sufficient insulation to prevent transverse spin torque current from entering MP trailing side or TS bottom surface from the SHE layer and thereby avoid a SHE assist.

Figure 13A:
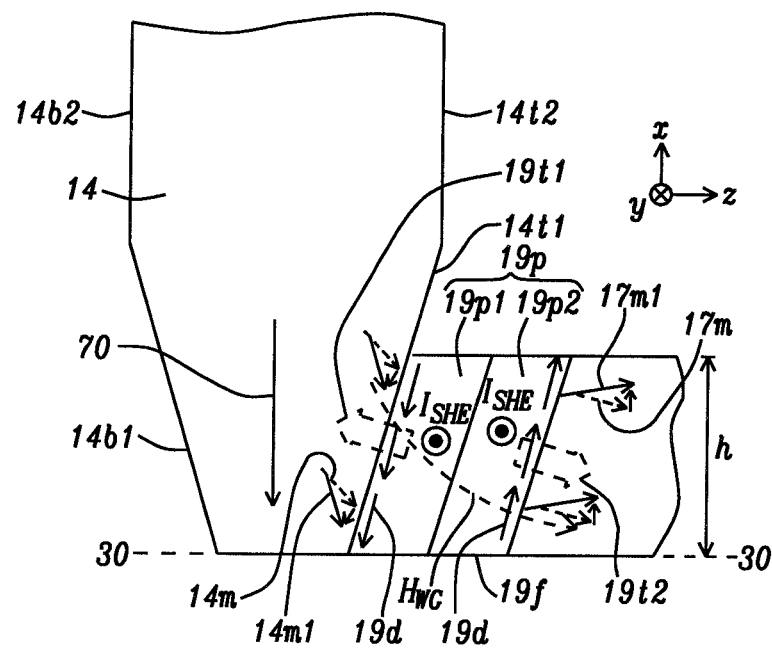
FIG. 13A and FIG. 13B are modifications of the first embodiment depicted in FIG. 7A and FIG. 7B, respectively, wherein the SHE layer has at least two sub-layers each made of a different SHA material according to an embodiment of the present disclosure.

According to a seventh embodiment illustrated in FIG. 13A, SHE layer 19p may be comprised of a stack of at least two layers wherein a lower SHE sub-layer 19p1 adjoins the MP trailing side 14t1, and an upper SHE sub-layer 19p2 contacts the TS bottom surface 17b. A key feature is that SHE sub-layers 19p1, 19p2 are comprised of different positive giant SHA materials so that the current density in each sub-layer may be tuned. For example, SHE sub-layer 19p1 may have a larger SHA than SHE sub-layer 19p2 such that transverse spin transfer torque 19t1 is greater than transverse spin transfer torque 19t2 at the same $I_{SHE}$ current density. Although the exemplary embodiment represents a modification of the first embodiment, SHE layer 19p in the second through sixth embodiments may be a multilayer as well. Thus, lower SHE sub-layer 19p1 generates transverse spin transfer torque on local MP magnetization 14m when the lower SHE sub-layer contacts the MP trailing side. Also, upper SHE sub-layer 19p2 produces transverse spin transfer torque 19t2 on the local TS magnetization when the upper SHE sub-layer adjoins the TS bottom surface.

In related patent application HT18-048, an alternative SHE design is disclosed where an insulator layer is formed between a first SHE (SHE1) layer contacting the MP trailing side 14t1 and a second SHE (SHE2) layer adjoining the TS bottom surface 17b. Accordingly, one of SHE1 and SHE2 may be made of a positive giant SHA material while the other is a negative SHA giant material, and $I_{SHE}$ in SHE1 is applied in the opposite direction to $I_{SHE}$ in SHE2.

Figure 13B:
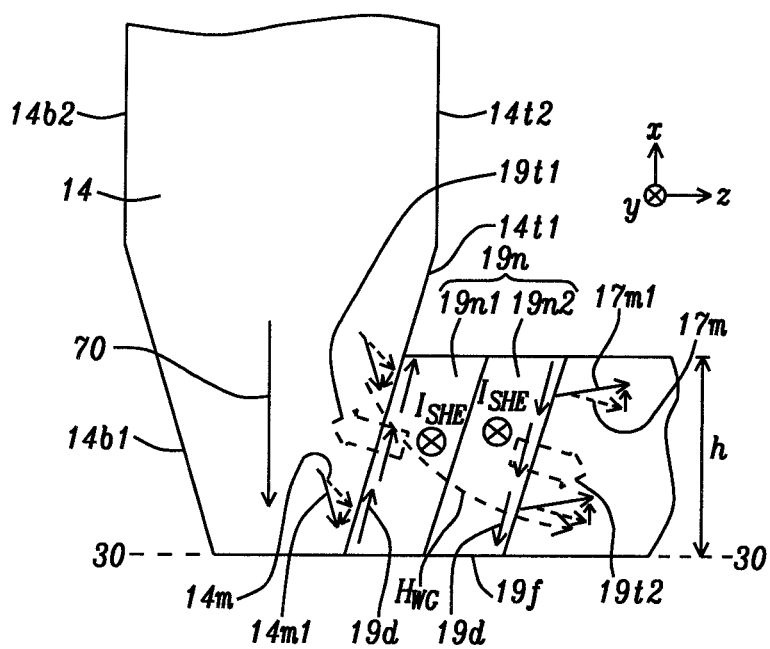

SHE layer 19n in FIG. 7B (or alternatively in FIGS. 8B-12B) may be replaced with a multilayer as in FIG. 13B where there is a lower SHE sub-layer 19n1 and an upper SHE sub-layer 19n2 each made of a different negative giant SHA material. Again, the lower SHE sub-layer generates transverse spin transfer torque 19t1 on local MP magnetization 14m when the lower SHE sub-layer contacts the MP trailing side 14t1. Similarly, the upper SHE sub-layer produces transverse spin transfer torque 19t2 on local TS magnetization 17m when the upper SHE sub-layer adjoins the TS bottom surface 17b. In both FIG. 13A and FIG. 13B, $I_{SHE}$ is in the same direction in both SHE sub-layers.

Figure 14:
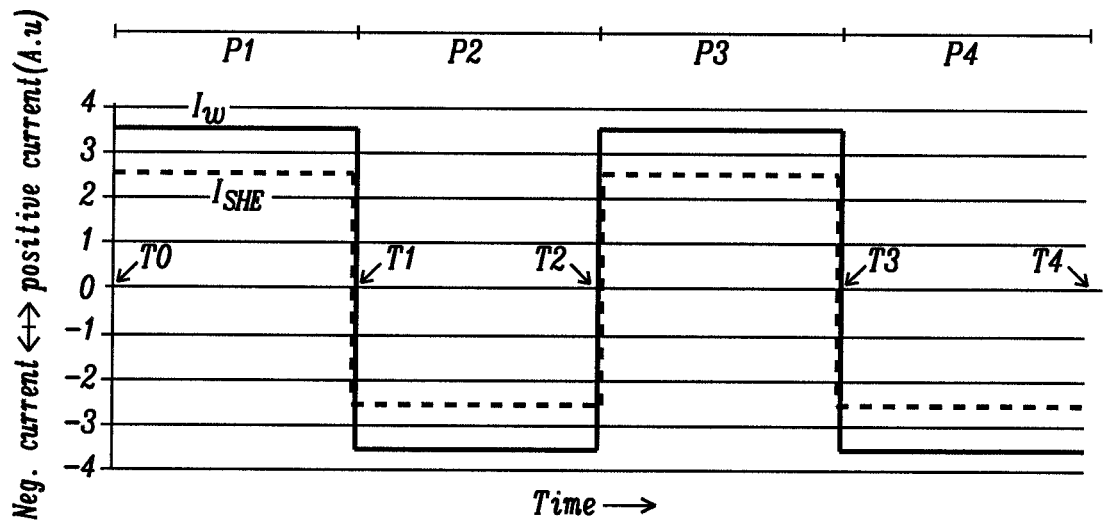
FIG. 14 is an Iw waveform showing that a current ($I_{SHE}$) applied through the SHE layer may be synchronized with the write current (Iw) during each bit writing (transition) period according to an embodiment of the present disclosure.

Unlike the constant direct current used in MAMR and STRAMR devices, SHAMR devices require current $I_{SHE}$ in the SHE layer to synchronize with the Iw waveform and the $I_{SHE}$ current density may be time dependent. As depicted in FIG. 14, $I_{SHE}$ and Iw are plotted as a function of time during successive bit writing (transition) periods P1-P4. During P1 (between T0 and T1), both $I_{SHE}$ and Iw are shown with a positive polarity. At each of T0-T4, both $I_{SHE}$ and Iw are switched to an opposite polarity compared with the previous write period. In other embodiments (not shown), $I_{SHE}$ and Iw may have opposite polarity to provide an out of phase synchronization. Typically, $I_{SHE}$ is substantially less than Iw. For example, $I_{SHE}$ has a current density of about $10^8$-$10^9$ Amps/cm$^2$, and with a thickness of 8 nm, and a height from a front side to backside of 60 nm, total current in the SHE layer is around 1-6 mA zero-to-peak amplitude (AMP). Generally, Iw has zero-to-peak AMP of about 30-80 mA. Thus, at time t, the relationship between the two currents is expressed as $I_{SHE}(t)=K\times Iw(t)$ where K is a number between −1 and +1. K is time independent when the $I_{SHE}$ and Iw circuits are in series. If the two circuits are in parallel or controlled separately, K may be time dependent to a certain extent when there is an optimum SHE assist. In some embodiments, there may be an overshoot of $I_{SHE}(t)$ at T1, for instance, to realize a shorter $t_R$ depicted in FIG. 15. In other words, K may have a larger absolute value immediately after one or more of T0-T4, and then take on a smaller absolute value during $t_M$ after the MP field has completely switched from down to up, or from up to down.

Figure 15:
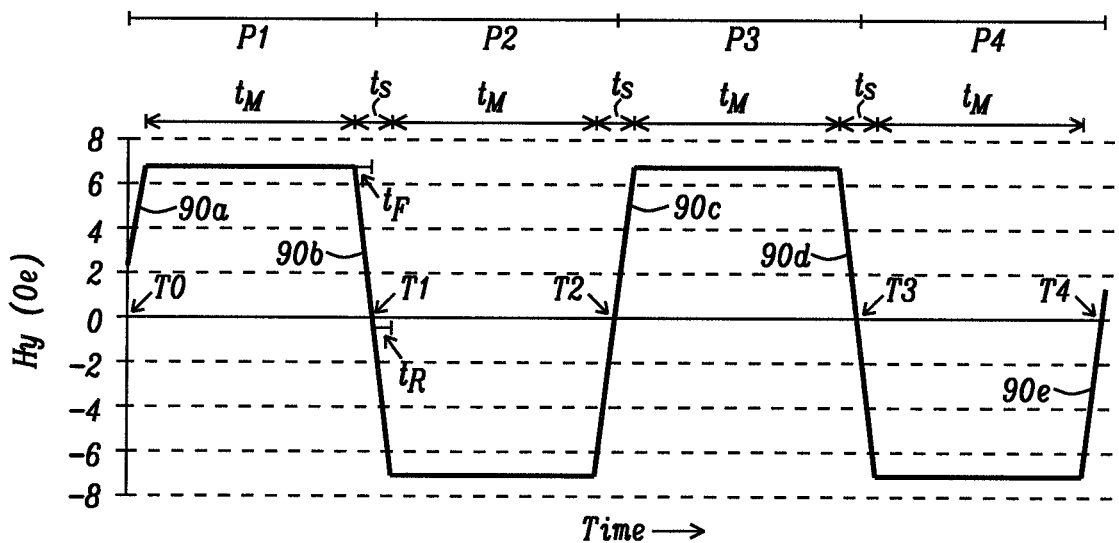
FIG. 15 shows switching time including fall time and rise time during the transition from writing one bit to the next bit.

Ideally, the Iw waveform is a step transition at each of T0-T4 in the absence of a SHAMR assist involving SHE technology described in the embodiments of the present disclosure. However, as shown in FIG. 15, during a typical Iw (+) to (−) polarity transition, the writer has a finite fall time ($t_F$) and finite rise time ($t_R$) between periods ($t_M$) where a maximum Hy field is realized and the MP write field is orthogonal to the ABS (not shown). As a result, each switching period is represented in the Iw waveform by slopes 90a-90e that are non-vertical. Without a SHAMR assist, MP magnetization will follow the Iw transition, but with a finite time delay ($t_R$), usually at the sub-nanosecond time scale. After each of T0-T4, MP write field 70 (FIG. 6B) is not switched to an opposite direction from the previous write period until the end of $t_R$.

Referring again to FIG. 7A when there is a SHAMR assist with a positive giant SHA material, spin current is built up and is generating transverse spin torque 19t1 to rotate local MP magnetization 14m toward the ABS 30-30 within 1 to tens of picoseconds after current $I_{SHE}$ direction is reversed. Accordingly, transverse spin torque works together with the Iw induced field to flip the MP write field direction thereby yielding a shorter rise time ($t_R$), which means each of the slopes 90a-90e (FIG. 15) will be more vertical than when no SHAMR assist is applied. Each of the other SHAMR embodiments described herein also provide a decreased rise time.

In actual practice, there is an overshoot in Iw immediately after a transition to ensure a fast rise time in a conventional PMR writer. Using a SHAMR assist according to an embodiment of the present disclosure, an overshoot in current through the SHE layers would increase transverse spin transfer torque as well. Faster rise time with a SHAMR assist will improve the writer's transition speed and provide better transition sharpness as an additional advantage to enhancing the MP write field, and boosting the TS return field in certain embodiments.

In a SHAMR device design where $I_{SHE}$ is synchronized with Iw, there is a possibility of maintaining the number of pads used in a conventional PMR writer. Depending on the resistance of the SHE layer and the leads to the SHE layer, the circuit for applying $I_{SHE}$ may be either in series or in parallel with the Iw circuit. In other words, the SHAMR current input may be applied across the Iw pads to avoid adding new pads dedicated to the $I_{SHE}$ circuit. In yet another embodiment, the $I_{SHE}$ circuit and Iw circuit may be controlled independently with the use of additional pads for the $I_{SHE}$ circuit.

Figure 16:
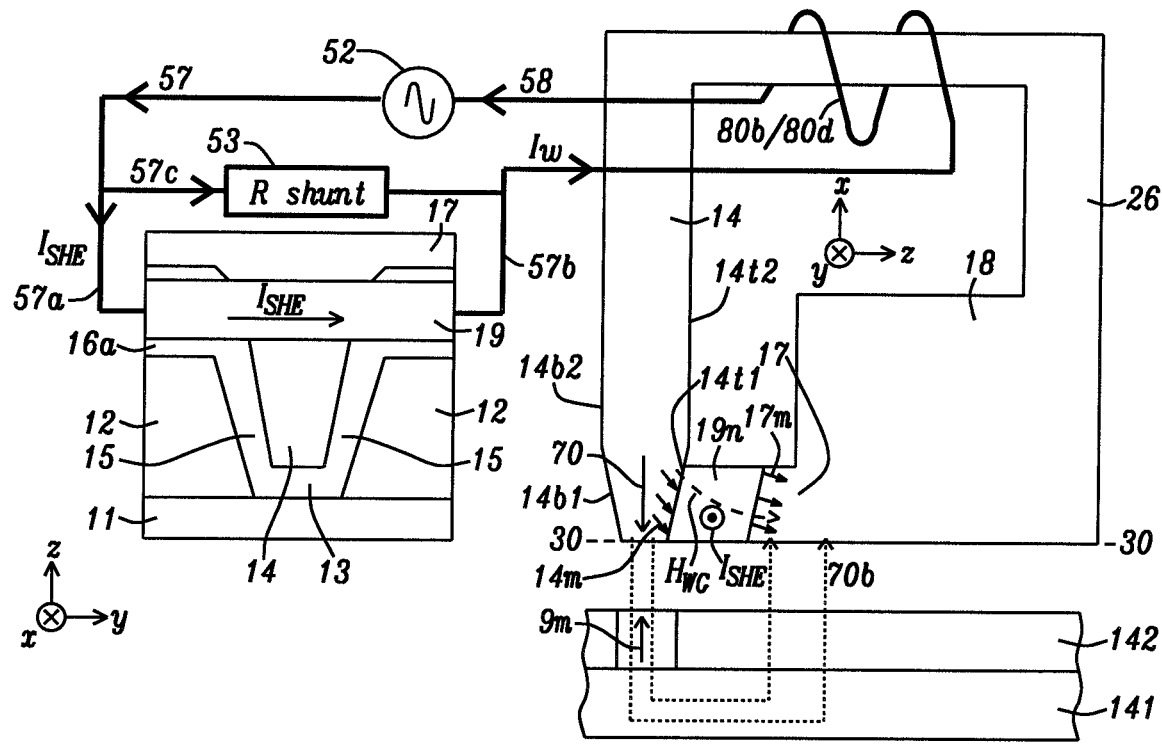
FIG. 16 is a schematic view of an $I_{SHE}$ circuit configured in series with an Iw circuit according to an embodiment of the present disclosure.

FIG. 16 is a schematic drawing illustrating an $I_{SHE}$ circuit configured in series with the Iw circuit. The SHAMR device features in FIGS. 6A-6B are retained except the write shield (WS) 18 is now shown on TS 17, and connects with PP3 trailing shield 26. There is typically a top yoke (TY) between the PP3 trailing shield and MP 14 but the TY is omitted in this drawing. Since both circuits are difficult to depict from a single vantage point, the $I_{SHE}$ circuit is shown in an ABS view on the left side of the drawing and comprises current outflow 57 from source 52, lead 57a to one side of SHE layer 19 and lead 57b from the opposite side of the SHE layer. An R shunt 53 is used to divide the current outflow 57 into two paths so that the current in lead 57a may be different from the current in lead 57c through the R shunt. The Iw circuit on the right side of the diagram is a down-track cross-sectional view at the center plane in FIG. 6A and comprises leads 57, 57c, coils 80b/80d for generating flux in MP 14, and return lead 58 back to the source.

Figure 17:
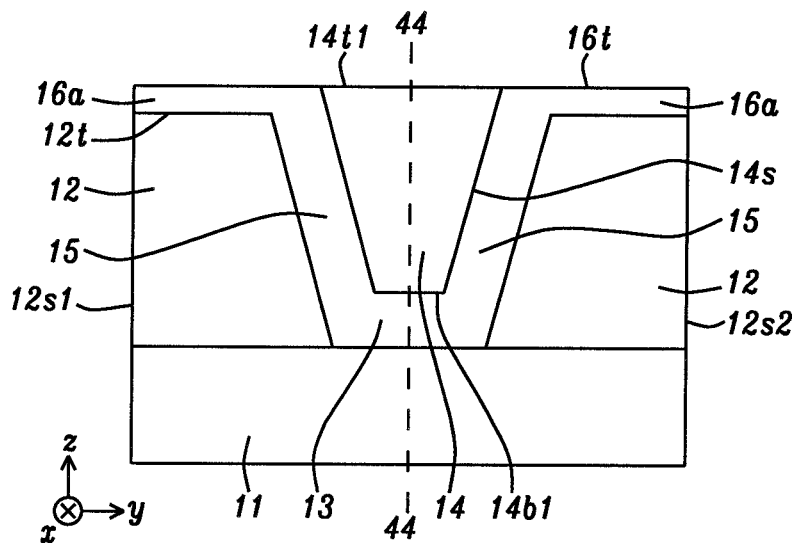
FIGS. 17-19 depict ABS views of a process flow where a SHE layer is formed between a MP trailing side and TS bottom surface according to an embodiment of the present disclosure.
Figure 18:
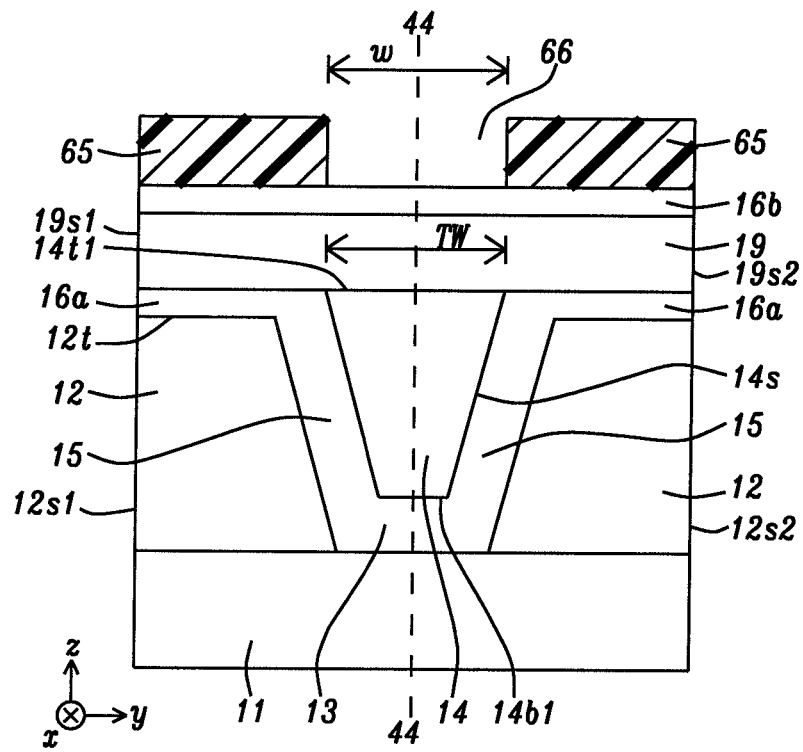
Figure 19:
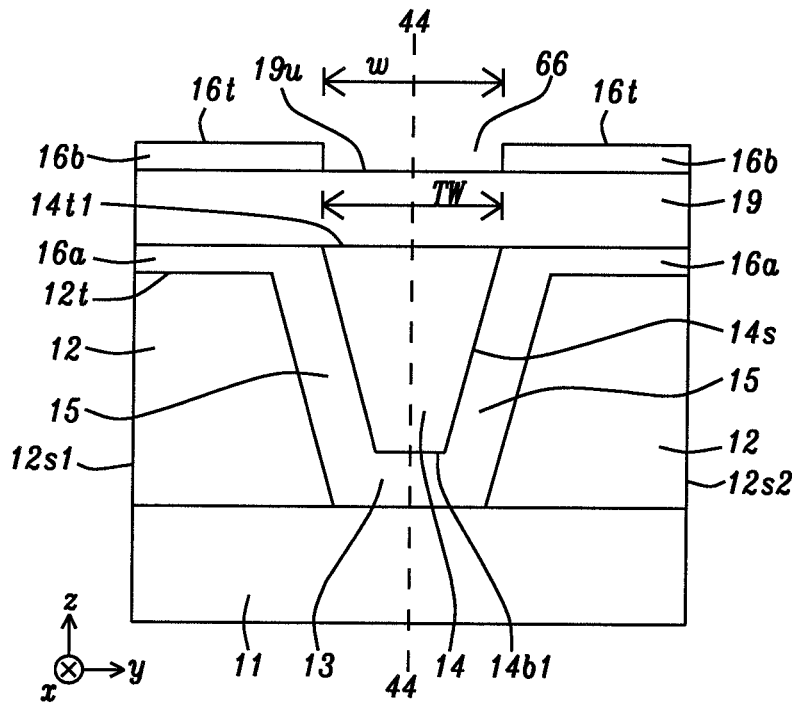

The present disclosure also encompasses a process sequence for fabricating a SHE layer in a write gap according to an embodiment described herein and is provided in the ABS views of FIGS. 17-19. The partially formed SHAMR device comprising MP 14 that adjoins side gaps 15 and leading gap 13 in FIG. 17 is provided according to a conventional process sequence. Side shield top surfaces 12t are covered with WG layer 16a having top surface 16t that is coplanar with a front edge of the MP tapered trailing side 14t1. Side shields 12 have an outer side 12s1 and 12s2 on opposite sides of center plane 44-44.

Referring to FIG. 18, SHE layer 19 and WG layer 16b are sequentially deposited on MP trailing side 14t1 and on top surface 16t of WG layer 16a. It should be understood that the SHE layer may be a positive SHE layer 19p or a negative SHE layer 19n according to various embodiments of the present disclosure. Note that the SHE layer has a full width between outer sides 19s1 and 19s2 that are aligned to be coplanar with SS sides 12s1 and 12s2, respectively. Thus, no etching is required to pattern the SHE layer, which is an advantage for the SHAMR device over other devices based on SHE technology that are used in the art. Moreover, as indicated earlier, a single SHE layer deposition requires fewer process steps than fabricating a STO device that is comprised of three or more layers in MAMR or STRAMR devices. Thereafter, a photoresist layer is coated on WG layer 16b and patternwise exposed and developed to provide a photoresist mask 65 having an opening 66 with cross-track width w that is bisected by plane 44-44. The opening exposes a center portion of WG layer 16b above the MP trailing side having track width (TW) where TW≤w.

In FIG. 19, the photoresist mask pattern is etch transferred through WG layer 16b using a reactive ion etch (RIE) or ion beam etch (IBE) process, for example, thereby exposing a center portion of the top surface 19u of SHE layer 19. The photoresist mask is removed with a conventional process to provide a top surface 16t of WG layer 16b on each side of opening 66. Thereafter, a conventional sequence of steps is followed including depositing TS 17 and overlying layers in the write head before a lapping process is performed to yield the PMR writer shown in FIG. 5 with a SHAMR configuration.

In all SHAMR device embodiments described herein, kilo flux change per inch (kFCI) and area density capability (ADC) are expected to improve with one or both of MP write field enhancement (better overwrite property), and enhanced TS return field (better BER).

While the present disclosure has been particularly shown and described with reference to, the preferred embodiments thereof, it will be understood by those skilled in the art that various changes in form and details may be made without departing from the spirit and scope of this disclosure.

We claim:

1. A Spin Hall Effect (SHE) assisted magnetic recording (SHAMR) device, comprising:
    (a) a main pole (MP) that is configured to generate a magnetic write field in a MP tip with a front side at an air bearing surface (ABS), and having a local magnetization proximate to a MP trailing side that adjoins a write gap (WG) and faces a trailing shield;
    (b) the trailing shield (TS) with a front side at the ABS, and a local magnetization proximate to a bottom surface that faces the MP; and
    (c) a Spin Hall Effect (SHE) layer formed in the WG and having a bottom surface that contacts the MP trailing side and a top surface adjoining the TS bottom surface, and comprised of a Spin Hall Angle (SHA) material, wherein the SHE layer is configured to generate a first transverse spin transfer torque that tilts the local MP magnetization to a direction that is more orthogonal to the ABS thereby enhancing the write field, and is configured to generate a second transverse spin transfer torque that tilts the local TS magnetization to a direction that is more orthogonal to the ABS to increase a TS return field.

2. The SHAMR device of claim 1 wherein the SHE layer has a down-track thickness less than 12 nm between the MP trailing side and TS bottom surface.

3. The SHAMR device of claim 1 wherein said SHAMR device is configured to apply a current ($I_{SHE}$) across the SHE layer in a first cross-track direction when the write field has a direction that is out of the MP tip to a magnetic medium, and to apply $I_{SHE}$ across the SHE layer in a second cross-track direction opposite to the first cross-track direction when the write field direction is into the MP tip from the magnetic medium, and wherein the SHE layer is comprised of a positive giant SHA material having an absolute value for SHA that is >0.05.

4. The SHAMR device of claim 1 wherein said SHAMR device is configured to apply a current ($I_{SHE}$) across the SHE layer in a first cross-track direction when the write field has a direction that is into the MP tip from a magnetic medium, and to apply $I_{SHE}$ across the SHE layer in a second cross-track direction that is opposite to the first cross-track direction when the write field direction is out of the MP tip into the magnetic medium, and wherein the SHE layer is comprised of a negative giant SHA material having an absolute value for SHA that is >0.05.

5. The SHAMR device of claim 1 wherein said SHAMR device is configured to apply a current ($I_{SHE}$) in a cross-track direction across the SHE layer to generate the first and second transverse spin transfer torque, and is configured to synchronize $I_{SHE}$ with a write current (Iw) that is applied through a circuit comprised of Iw pads and generates the write field.

6. The SHAMR device of claim 5 wherein $I_{SHE}$ is also applied across the Iw pads so that an $I_{SHE}$ circuit is either in parallel or in series with the Iw circuit.

7. The SHAMR device of claim 1 wherein the SHE layer has a front side at the ABS.

8. The SHAMR device of claim 1 wherein the SHE layer has a front side that is recessed to a height of 20 nm to 80 nm from the ABS.

9. The SHAMR device of claim 5 wherein said SHAMR device is configured such that $I_{SHE}$ has no threshold current density requirement in order to generate the first and second transverse spin transfer torque.

10. The SHAMR device of claim 1 wherein the SHE layer is comprised of at least first and second sub-layers wherein the first SHE sub-layer is made of a different giant Spin Hall Angle (SHA) material than the second SHE sub-layer, and wherein the first SHE sub-layer contacts the MP trailing side and is configured to generate the first transverse spin transfer torque, and the second SHE sub-layer adjoins the TS bottom surface and is configured to generate the second transverse spin transfer torque.

11. The SHAMR device of claim 10 wherein said SHAMR device is configured so that the first SHE sub-layer has a greater SHA value than the second SHE sub-layer, and the first transverse spin torque is larger than the second transverse spin transfer torque when $I_{SHE}$ has a first current density in both of the first and second SHE sub-layers.

12. The SHAMR device of claim 6 wherein the $I_{SHE}$ and Iw circuits are connected in series, and a relationship between $I_{SHE}$ and Iw is expressed as $I_{SHE}(t)=K \times Iw(t)$ where K is a number between −1 and +1 that is time independent, and t is time.

13. The SHAMR device of claim 6 wherein the $I_{SHE}$ and Iw circuits are connected in parallel or controlled independently, and a relationship between $I_{SHE}$ and Iw is expressed as $I_{SHE}(t)=K \times Iw(t)$ where K is a number between −1 and +1 that is time dependent, and t is time.

14. A head gimbal assembly (HGA), comprising:
    (a) the SHAMR device of claim 1; and
    (b) a suspension that elastically supports the SHAMR device, wherein the suspension has a flexure to which the SHAMR device is joined, a load beam with one end connected to the flexure, and a base plate connected to the other end of the load beam.

15. A magnetic recording apparatus, comprising:
    (a) the HGA of claim 14;
    (b) a magnetic recording medium positioned opposite to a slider on which the SHAMR device is formed;
    (c) a spindle motor that rotates and drives the magnetic recording medium; and
    (d) a device that supports the slider, and that positions the slider relative to the magnetic recording medium.

16. A Spin Hall Effect (SHE) assisted magnetic recording (SHAMR) device, comprising:
   (a) a main pole (MP) that is configured to generate a magnetic write field in a MP tip with a front side at an air bearing surface (ABS), and having a local magnetization proximate to a MP trailing side that adjoins a write gap (WG) with a first thickness between the MP trailing side and a trailing shield bottom surface;
   (b) a trailing shield (TS) with a front side at the ABS, and a local magnetization proximate to the TS bottom surface that faces the MP; and
   (c) a Spin Hall Effect (SHE) layer formed in the WG and comprised of a Spin Hall Angle (SHA) material having a thickness less than the first thickness, wherein the SHE layer is configured to one or both generate a first transverse spin transfer torque that tilts the local MP magnetization to a direction that is more orthogonal to the ABS thereby enhancing the write field, and to generate a second transverse spin transfer torque that tilts the local TS magnetization to a direction that is more orthogonal to the ABS to increase a TS return field.

17. The SHAMR device of claim 16 wherein the SHE layer has a down-track thickness less than 12 nm.

18. The SHAMR device of claim 16 wherein said SHAMR device is configured to apply a current ($I_{SHE}$), across the SHE layer in a first cross-track direction when the write field has direction that is out of the MP tip to a magnetic medium, and to apply $I_{SHE}$ across the SHE layer in a second cross-track direction that is opposite to the first cross-track direction when the write field direction is into the MP tip from the magnetic medium, and wherein the SHE layer is comprised of a positive giant SHA material having an absolute value for SHA that is >0.05.

19. The SHAMR device of claim 16 wherein said SHAMR device is configured to apply a current ($I_{SHE}$), across the SHE layer in a first cross-track direction when the write field has direction that is into the MP tip from a magnetic medium, and to apply $I_{SHE}$ across the SHE layer in a second cross-track direction that is opposite to the first cross-track direction when the write field direction is out of the MP tip and into the magnetic medium, and wherein the SHE layer is comprised of a negative giant SHA material having an absolute value for SHA that is >0.05.

20. The SHAMR device of claim 16 wherein said SHAMR device is configured to apply a current ($I_{SHE}$) in a cross-track direction across the SHE layer to generate the first and second transverse spin transfer torque, and is configured to synchronize $I_{SHE}$ with a write current (Iw) that is applied through a circuit comprised of Iw pads and generates the write field.

21. The SHAMR device of claim 20 wherein $I_{SHE}$ is also applied across the Iw pads so that an $I_{SHE}$ circuit is either in parallel or in series with the Iw circuit.

22. The SHAMR device of claim 16 wherein the SHE layer has a front side at the ABS.

23. The SHAMR device of claim 16 wherein the SHE layer has a front side that is recessed to a height of 20 nm to 80 nm from the ABS.

24. The SHAMR device of claim 16 wherein said SHAMR device is configured so that $I_{SHE}$ has no threshold current density requirement in order to generate the first and second transverse spin transfer torque.

25. The SHAMR device of claim 16 wherein the SHE layer contacts the MP trailing side, and a top surface of the SHE layer is separated from the TS bottom surface by a portion of the write gap so that only the first transverse spin transfer torque is in effect.

26. The SHAMR device of claim 16 wherein the SHE layer has a bottom surface that is separated from the MP trailing side, and the SHE layer contacts the TS bottom surface such that only the second transverse spin transfer torque is in effect.

27. The SHAMR device of claim 16 wherein the SHE layer is comprised of at least first and second sub-layers wherein the first SHE sub-layer is made of a different giant Spin Hall Angle (SHA) material than the second SHE sub-layer, and wherein first SHE sub-layer contacts the MP trailing side and the second SHE sub-layer is less than a first down-track distance from the TS bottom surface, or wherein the first SHE sub-layer is less than the first down-track distance from the MP trailing side and the second SHE sub-layer contacts the TS bottom surface so that the first SHE sub-layer generates the first transverse spin transfer torque and the second SHE sub-layer generates the second transverse spin transfer torque.

28. The SHAMR device of claim 25 wherein the first down-track distance is about 6 nm to 12 nm.

29. The SHAMR device of claim 21 wherein the $I_{SHE}$ and Iw circuits are connected in series, and a relationship between $I_{SHE}$ and Iw is expressed as $I_{SHE}(t)=K \times Iw(t)$ where K is a number between −1 and +1 that is time independent, and t is time.

30. The SHAMR device of claim 21 wherein the $I_{SHE}$ and Iw circuits are connected in parallel or controlled independently, and a relationship between $I_{SHE}$ and Iw is expressed as $I_{SHE}(t)=K \times Iw(t)$ where K is a number between −1 and +1 that is time dependent, and t is time.

31. A head gimbal assembly (HGA), comprising:
   (a) the SHAMR device of claim 16; and
   (b) a suspension that elastically supports the SHAMR device, wherein the suspension has a flexure to which the SHAMR device is joined, a load beam with one end connected to the flexure, and a base plate connected to the other end of the load beam.

32. A magnetic recording apparatus, comprising:
   (a) the HGA of claim 31;
   (b) a magnetic recording medium positioned opposite to a slider on which the SHAMR device is formed;
   (c) a spindle motor that rotates and drives the magnetic recording medium; and
   (d) a device that supports the slider, and that positions the slider relative to the magnetic recording medium.

33. A method of forming a Spin Hall Effect (SHE) assisted magnetic recording (SHAMR) device, comprising:
   (a) providing a main pole (MP) with a tapered trailing side having a front edge that is a track width (TW) at an air bearing surface (ABS) plane, and wherein the MP is separated from a side shield on each side of a center plane by a side gap, and wherein a first write gap (WG) layer is formed on a side shield top surface and the side gap on each side of a center plane that is orthogonal to the ABS and bisects the MP tapered trailing side;
   (b) sequentially depositing a SHE layer and a second WG layer on the first WG layer and MP tapered trailing side, wherein the SHE layer is comprised of a Spin Hall Angle (SHA) material;
   (c) forming an opening in the second WG layer with a photoresist patterning and etching sequence wherein the opening is bisected by the center plane and exposes a SHE layer center portion having width w where w≥TW; and (d) depositing a trailing shield (TS) on the second WG layer and that fills the opening such that the TS contacts the SHE layer center portion.

34. The method of claim 33 wherein the SHE layer is comprised of a positive giant SHA material, or a negative giant SHA material having an absolute value for SHA that is >0.05.

35. The method of claim 33 wherein the SHE layer has a front side at the ABS and extends to a height up to 80 nm in a direction orthogonal to the ABS.

36. The method of claim 33 wherein the SHE layer has a front side that is recessed to a height of 20 nm to 80 nm from the ABS.

37. The method of claim 33 wherein a side of the SHE layer is coplanar with a side of the side shield on each side of the center plane.

38. The method of claim 33 wherein w is from 30 nm to 150 nm.

* * * * *